US012523960B2

(12) United States Patent
Hirai et al.

(10) Patent No.: US 12,523,960 B2
(45) Date of Patent: Jan. 13, 2026

(54) IMAGE FORMING APPARATUS AND IMAGE FORMING SYSTEM

(71) Applicant: CANON KABUSHIKI KAISHA, Tokyo (JP)

(72) Inventors: Masahide Hirai, Shizuoka (JP); Shun-Ichi Ebihara, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/631,720

(22) Filed: Apr. 10, 2024

(65) Prior Publication Data

US 2024/0353784 A1 Oct. 24, 2024

(30) Foreign Application Priority Data

Apr. 11, 2023 (JP) ................................ 2023-064157

(51) Int. Cl.
*G03G 15/00* (2006.01)
*G03G 15/01* (2006.01)
(Continued)

(52) U.S. Cl.
CPC ..... *G03G 15/5062* (2013.01); *G03G 15/0121* (2013.01); *G03G 15/0189* (2013.01);
(Continued)

(58) Field of Classification Search
CPC ........... G03G 15/5062; G03G 15/0121; G03G 15/0189; G03G 15/0856; G03G 15/5079;
(Continued)

(56) References Cited

U.S. PATENT DOCUMENTS 8,190,039 B2 5/2012 Iida et al.
8,437,648 B2 5/2013 Tachibana
(Continued)

FOREIGN PATENT DOCUMENTS

JP 2005-091462 A 4/2005
JP 2009-042691 A 2/2009
(Continued)

OTHER PUBLICATIONS

Office Action dated Oct. 29, 2024, in Japanese Patent Application No. 2023-064157.
(Continued)

*Primary Examiner* — Sandra Brase
(74) *Attorney, Agent, or Firm* — Venable LLP

(57) ABSTRACT

An image forming apparatus includes a cartridge and a main assembly. The main assembly includes an acquiring portion, a switching mechanism, a detecting portion, and a controller. The controller controls the switching mechanism so that in a first period until an acquisition value on a use amount of the cartridge reaches a threshold, switching from the restricted state to the non-restricted state is not permitted in a case that abnormality of the cartridge is not detected by the detecting portion, and the switching from the restricted state to the non-restricted state is permitted in a case that the abnormality of the cartridge is detected by the detecting portion, and so that in a second period after the acquisition value reached the threshold, the switching from the restricted state to the non-restricted state is permitted.

15 Claims, 17 Drawing Sheets

(51) Int. Cl.
*G03G 15/08* (2006.01)
*G03G 21/16* (2006.01)

(52) U.S. Cl.
CPC ..... *G03G 15/0856* (2013.01); *G03G 15/5079* (2013.01); *G03G 15/556* (2013.01); *G03G 21/1633* (2013.01)

(58) Field of Classification Search
CPC ............. G03G 15/556; G03G 21/1633; G03G 15/553; G03G 2221/1654
See application file for complete search history.

(56) References Cited

U.S. PATENT DOCUMENTS

| | | | | |
|---|---|---|---|---|
| 9,880,493 | B2 | 1/2018 | Mochizuki et al. | |
| 10,571,855 | B2 | 2/2020 | Mochizuki et al. | |
| 11,194,283 | B2 | 12/2021 | Teshima et al. | |
| 2008/0131146 | A1* | 6/2008 | Kendall | G03G 15/553 399/27 |
| 2009/0041481 | A1* | 2/2009 | Iida | G03G 15/5079 399/12 |
| 2017/0315470 | A1* | 11/2017 | Mochizuki | G03G 15/0856 |
| 2019/0265636 | A1* | 8/2019 | Teshima | G03G 21/1633 |

FOREIGN PATENT DOCUMENTS

| | | | |
|---|---|---|---|
| JP | 2010-221597 | A | 10/2010 |
| JP | 2011-008142 | A | 1/2011 |
| JP | 2017-198856 | A | 11/2017 |
| JP | 2019-148756 | A | 9/2019 |
| JP | 2019-174725 | A | 10/2019 |
| JP | 2020-122701 | A | 8/2020 |
| JP | 2021-051247 | A | 4/2021 |

OTHER PUBLICATIONS

Japanese Office Action dated Feb. 4, 2025, in Japanese Patent Application No. 2023-064157.
Japanese Office Action dated Jul. 22, 2025, in Japanese Patent Application No. 2023-064157.

* cited by examiner (a)

(b)

IMAGE FORMING APPARATUS AND IMAGE FORMING SYSTEM

FIELD OF THE INVENTION AND RELATED ART

The present invention relates to an image forming apparatus and an image forming system, and relates to, for example, the image forming apparatus, such as a copying machine or a printer, of an electrophotographic type or an electrostatic recording type.

In a conventional color image forming apparatus, a plurality of photosensitive members are independently scanned with light beams by a plurality of optical devices, respectively, and toner images of colors are formed by a plurality of developing devices. The toner images of colors formed on the photosensitive members are superposed on an intermediary transfer belt and then are finally transferred onto a sheet, or are transferred superposedly onto a transfer material on a belt. Conventionally, such a tandem type is used and a color image is formed. In the image forming apparatus of the tandem type, the photosensitive member and a toner image forming means such as a developing means in each of image forming portions are integrally assembled into a cartridge, so that a process cartridge is provided in some instances. The resultant process cartridges each in a cartridge form are arranged in a line so as to be attachable to and detachable from an image forming apparatus main assembly. In the image forming apparatus provided with such process cartridges, for example, when a developer is used up, a user himself (herself) exchanges the process cartridge(s) without relying on a service person in some instances. By doing so, it becomes possible to form the image again, and in addition, other consumables such as the photosensitive member can also be exchanged at the same time, and therefore, a maintenance property is improved.

Incidentally, in the image forming apparatus, in consideration of environment, various techniques for causing the user to use a process cartridge including a toner container to its end have been proposed. For example, it has been disclosed that a stopper of the process cartridge is set invalid (release) and thus a state in which the process cartridge is mountable and dismountable is formed (for example, see, Japanese Laid-Open Patent Application (JP-A) 2005-091462). Further, it has been disclosed that a locking means for locking a cover of the toner container and a means for detecting a no toner state of the toner container are used (for example, JP-A 2011-008142). In this constitution, when the no toner state of the toner container occurs, lock of the cover of the toner container is released by an operation from the user, so that the toner container is made exchangeable.

Thus, in consideration of the environment, until the toner in the cartridge is used up, lock(ing) is carried out by providing a locking mechanism for prohibiting the exchange of the cartridge, so that the user cannot simply release the locking mechanism. However, in such a constitution, the following problem arises in some cases.

Depending on various use environments, use conditions, and the like for users, the case where an image defect due to the cartridge occurs before a timing when the exchange of the cartridge becomes possible would be also considered. In such a case, even in the case where the user desires the exchange of the cartridge, the user cannot exchange the cartridge until an exchangeable timing of the cartridge determined on an apparatus side. Further, when the image defect occurs, even in the case where the user can exchange the cartridge, there is a liability that the user erroneously exchanges a cartridge which does not cause the image defect, when the user exchanges a cartridge, so that there arises a problem such that unnecessary exchange is performed.

SUMMARY OF THE INVENTION

The present invention has been accomplished in the above-described circumferences. A principal object of the present invention is to prevent an erroneous exchange of a cartridge, which is not required to be exchanged, by properly notifying a consumable to be exchanged and thus to improve usability during the exchange of the cartridge.

In order to solve the above-described problem, according to an aspect of the present invention, there is provided an image forming apparatus comprising: a cartridge including an accommodating portion configured to accommodate a developer; and a main assembly to which the cartridge is detachably mountable, wherein the main assembly includes an acquiring portion configured to acquire an acquisition value on a use amount of the cartridge; a switching mechanism capable of switching a restricted state in which detachment of the cartridge from the main assembly is restricted and a non-restricted state in which the detachment is not restricted; a detecting portion configured to detect abnormality of the cartridge; and a controller configured to control the switching mechanism, and wherein the controller controls the switching mechanism so that in a first period until the acquisition value reaches a threshold, switching from the restricted state to the non-restricted state is not permitted in a case that the abnormality of the cartridge is not detected by the detecting portion, and the switching from the restricted state to the non-restricted state is permitted in a case that the abnormality of the cartridge is detected by the detecting portion, and so that in a second period after the acquisition value reached the threshold, the switching from the restricted state to the non-restricted state is permitted.

According to another aspect of the present invention, there is provided an image forming system comprising: an image forming apparatus which includes a cartridge including an accommodating portion configured to accommodate a developer, and a main assembly to which the cartridge is detachably mountable; and a server connected to the image forming apparatus via a network, wherein the image forming system includes an acquiring portion configured to acquire an acquisition value on a use amount of the cartridge; a detecting portion configured to detect abnormality of the cartridge; and at least one controller configured to control the switching mechanism, wherein the main assembly includes a switching mechanism capable of switching a restricted state in which detachment of the cartridge from the main assembly is restricted and a non-restricted state in which the detachment is not restricted; wherein the at least one controller controls the switching mechanism so that in a first period until the acquisition value reaches a threshold, switching from the restricted state to the non-restricted state is not permitted in a case that the abnormality of the cartridge is not detected by the detecting portion, and the switching from the restricted state to the non-restricted state is permitted in a case that the abnormality of the cartridge is detected by the detecting portion, and so that in a second period after the acquisition value reached the threshold, the switching from the restricted state to the non-restricted state is permitted.

According to a further aspect of the present invention, there is provided an image forming apparatus comprising: a cartridge accommodating a developer; and a main assembly to which the cartridge is detachably mountable, wherein the main assembly includes a notifying portion configured to notify first information on a lifetime or an exchange of the cartridge and second information on abnormality of the cartridge; a switching mechanism capable of switching a restricted state in which detachment of the cartridge from the main assembly is restricted and a non-restricted state in which the detachment is not restricted; and a controller configured to control the switching mechanism, and wherein the controller controls the switching mechanism so that in a first period until the first information is notified, switching of the switching mechanism from the restricted state to the non-restricted state is not permitted in a case that the second information is not notified, and the switching of the switching mechanism from the restricted state to the non-restricted state is permitted in a case that the second information is notified, and so that in a second period after the first information is notified, the switching from the restricted state to the non-restricted state is permitted.

Further features of the present invention will become apparent from the following description of exemplary embodiments with reference to the attached drawings.

Figure 3:
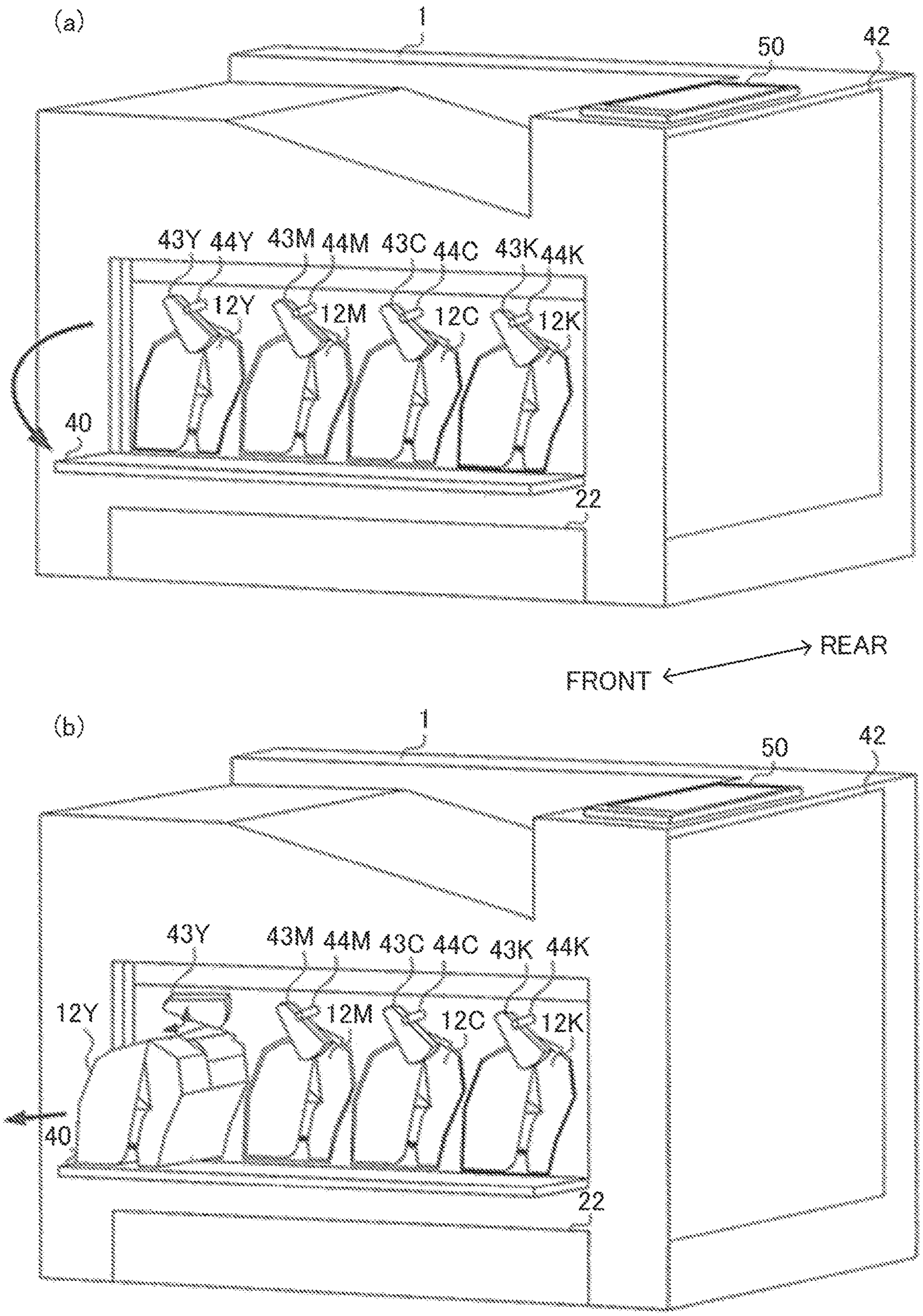

Parts (a) and (b) of FIG. 3 are perspective views each showing a locking mechanism for a cartridge in the embodiment 1.

Figure 4:
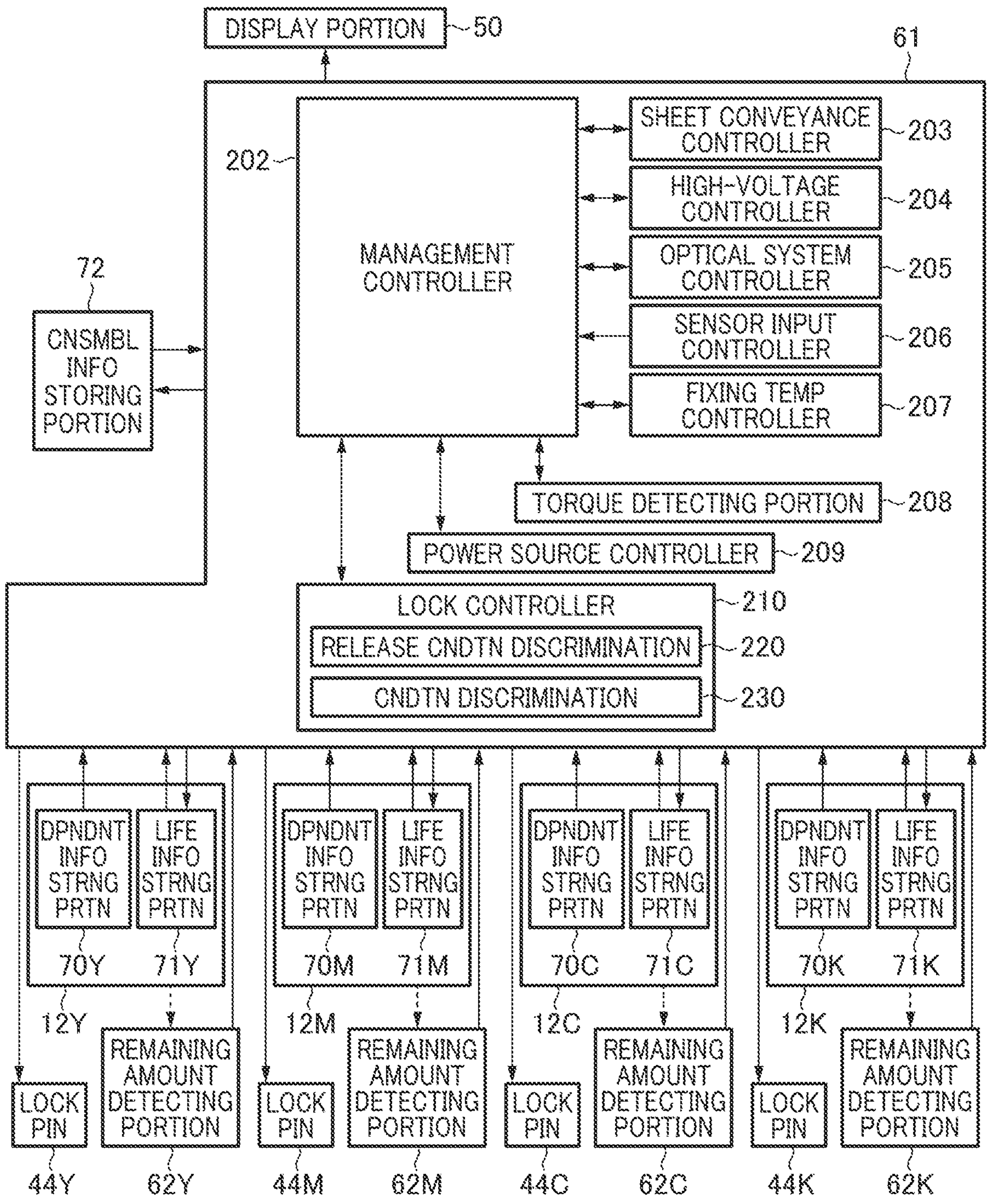

FIG. 4 is a block diagram of a control constitution in the embodiment 1.

Figure 5:
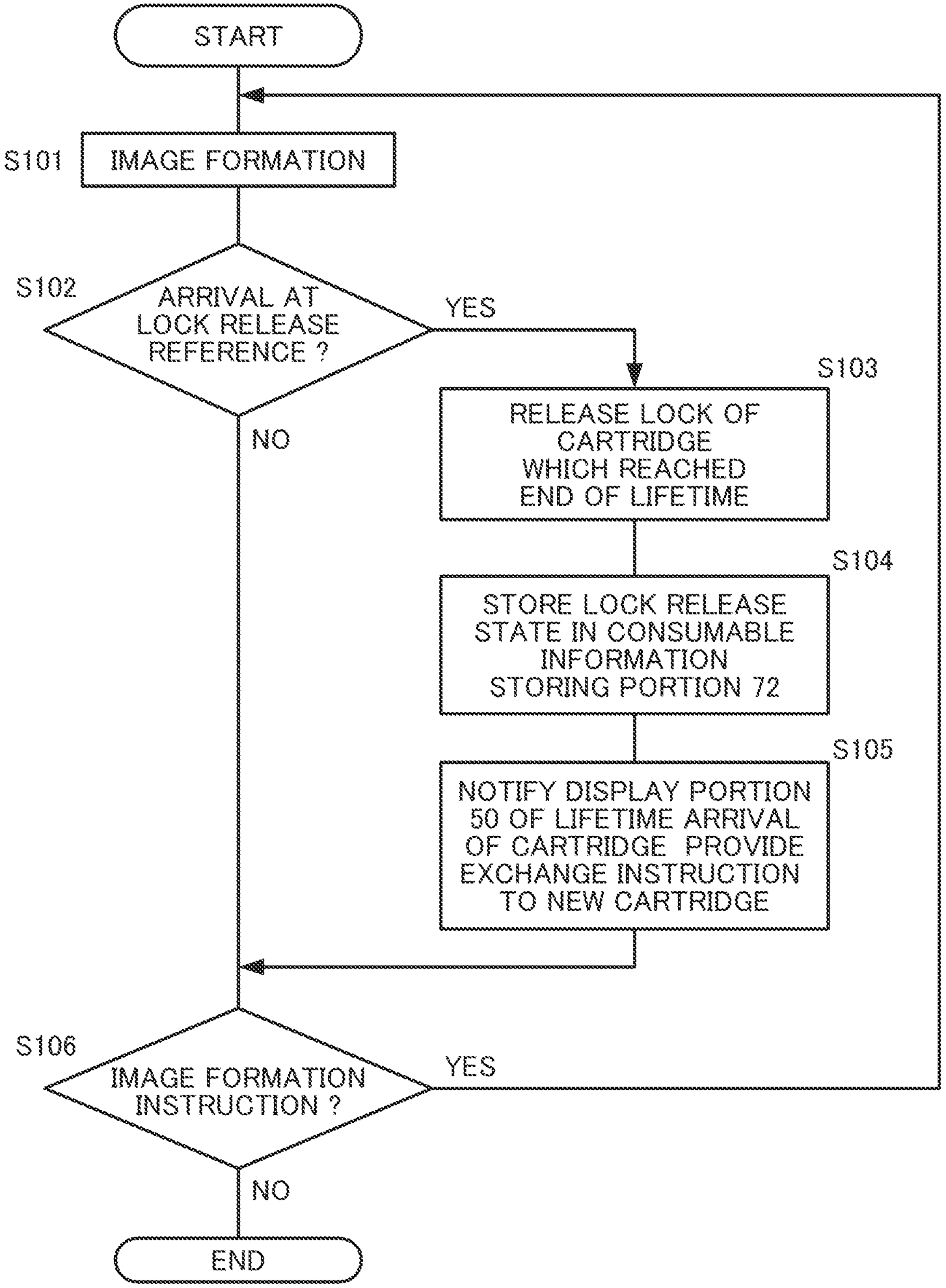

FIG. 5 is a flowchart showing control at a time when a remaining lifetime reaches a lock release reference.

Figure 6:
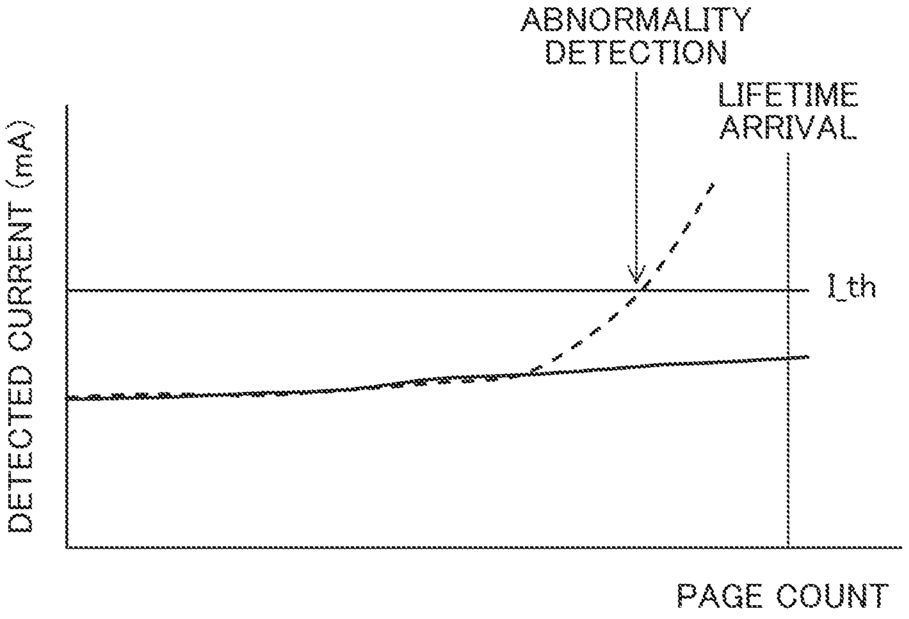

FIG. 6 is a graph showing a driving torque discrimination in the embodiment 1.

Figure 7:
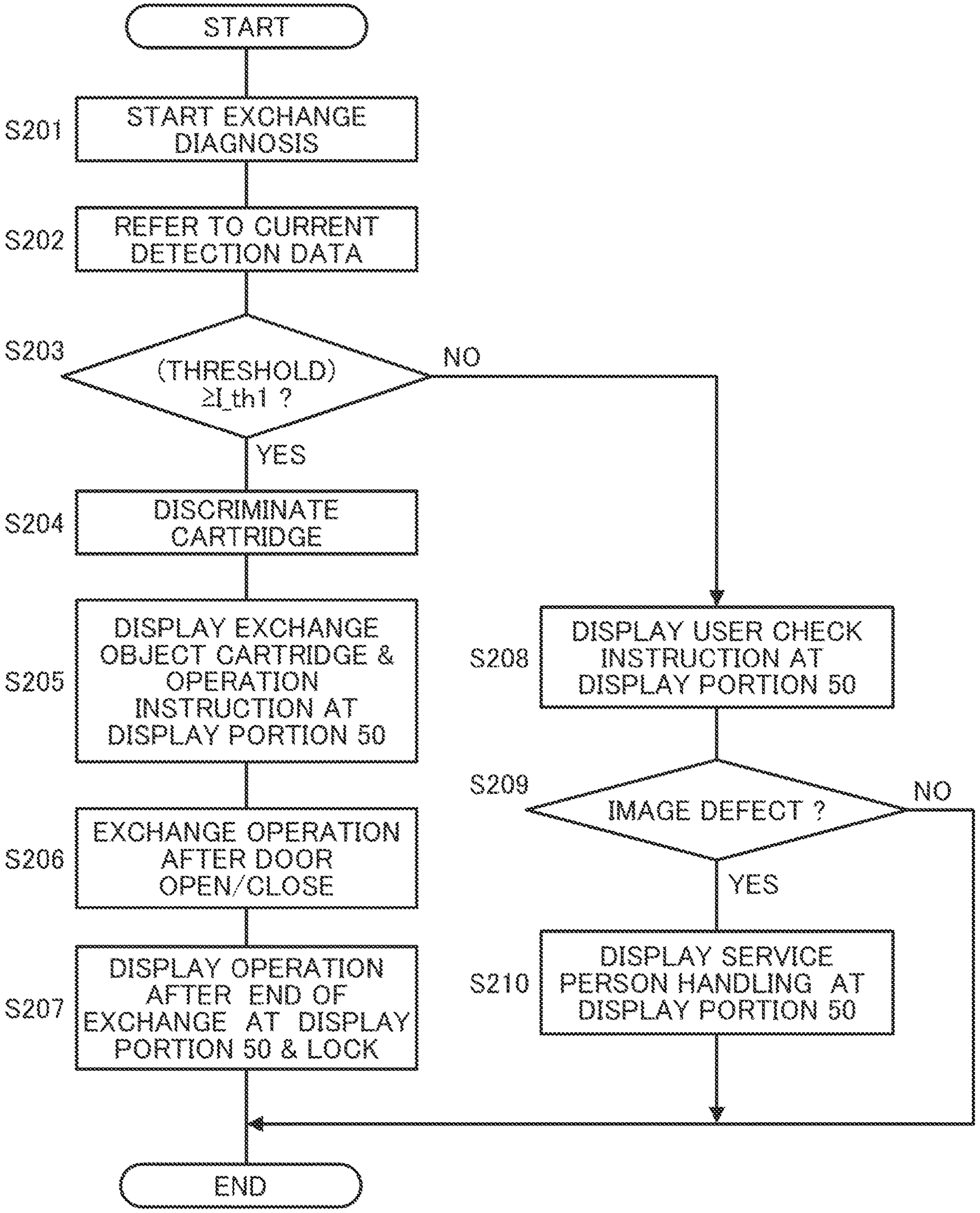

FIG. 7 is a flowchart showing the driving torque discrimination.

Figure 8:
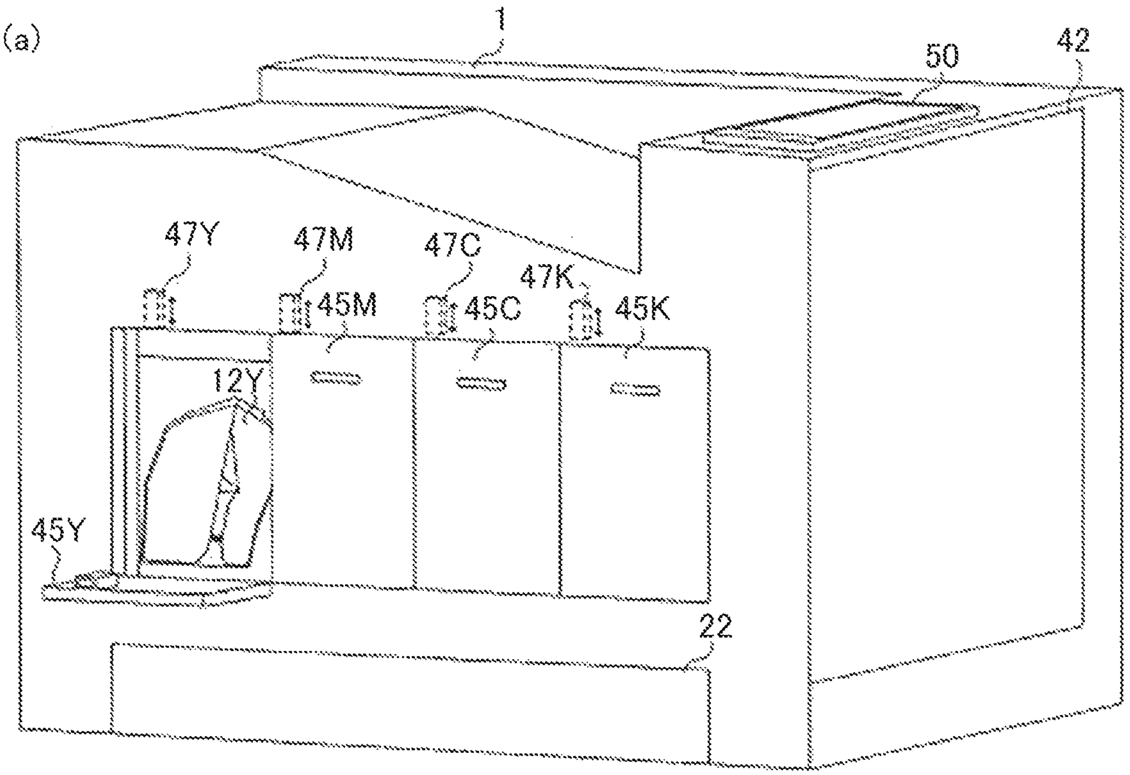
Figure 8:
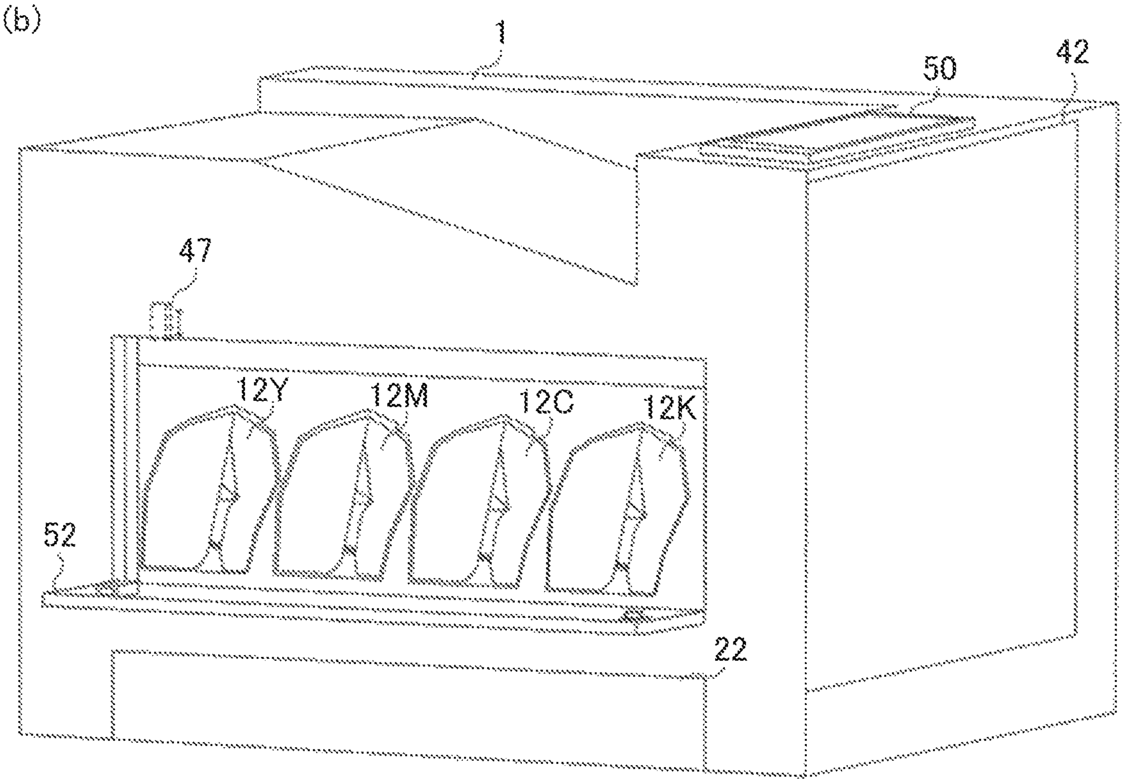

Parts (a) and (b) of FIG. 8 are perspective views each showing a locking mechanism with another constitution in the embodiment 1.

Figure 9:
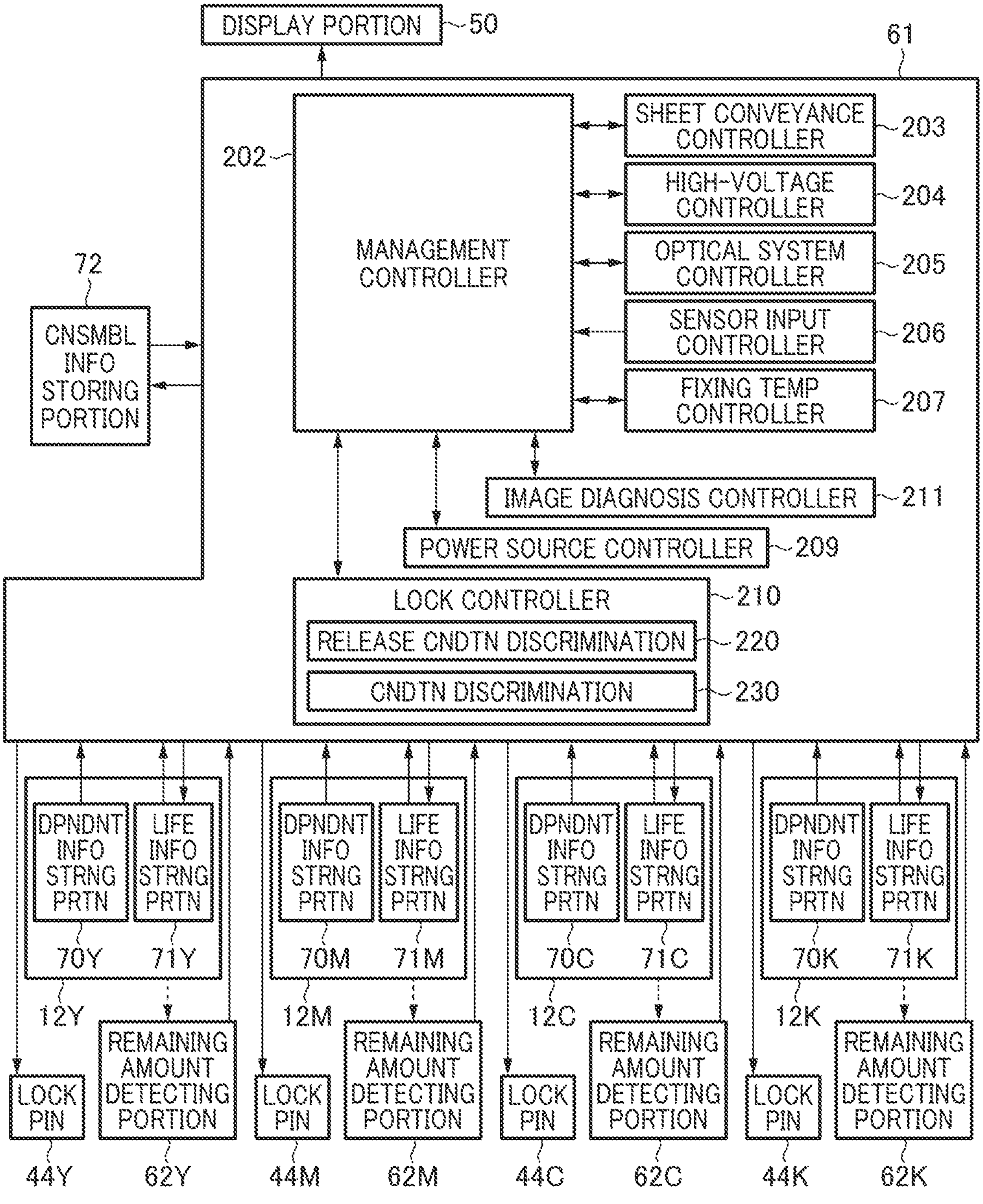

FIG. 9 is a block diagram of a control constitution in an embodiment 2.

Figure 10:
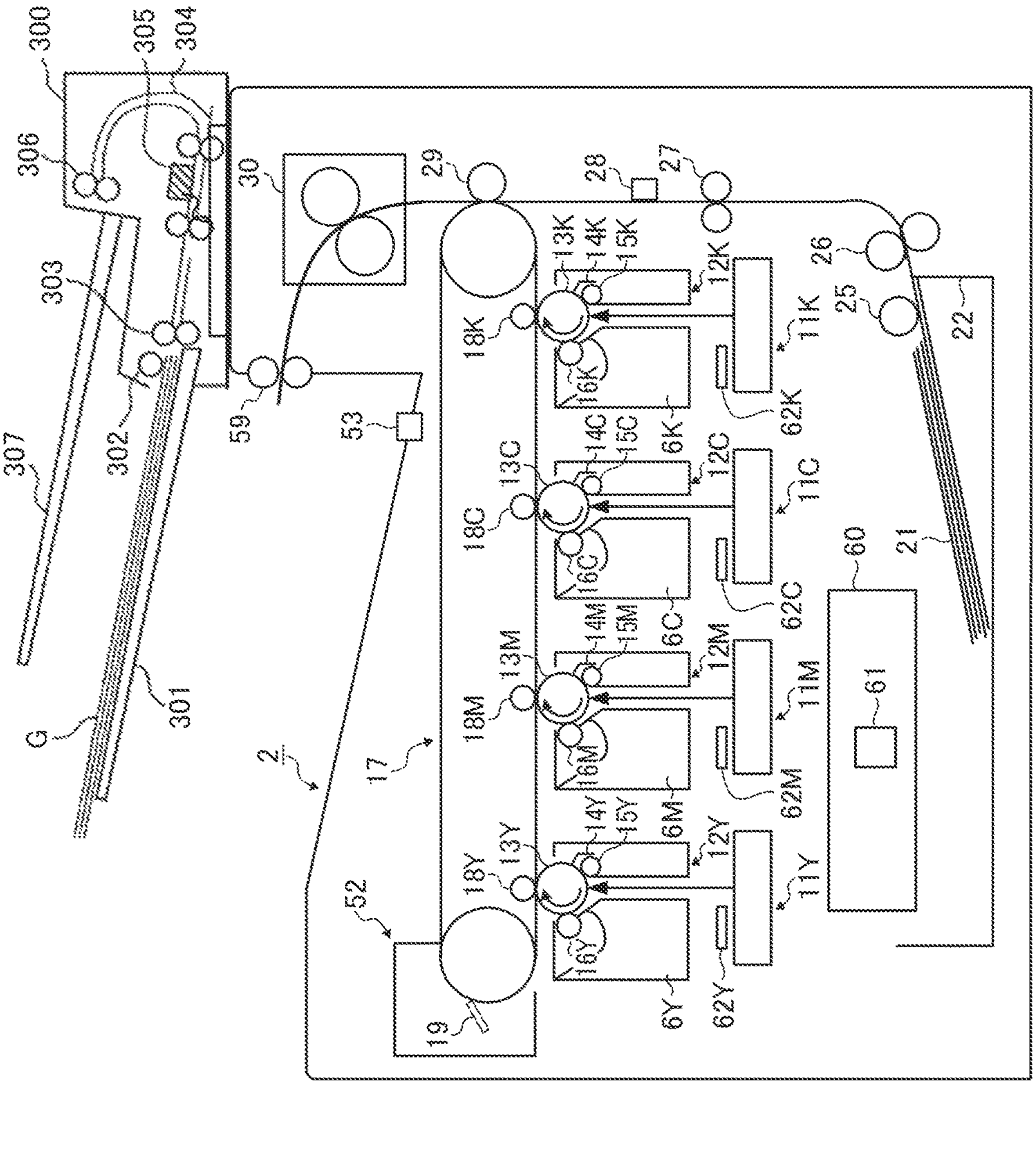

FIG. 10 is a schematic sectional view of an image forming apparatus of the embodiment 2.

Figure 11:
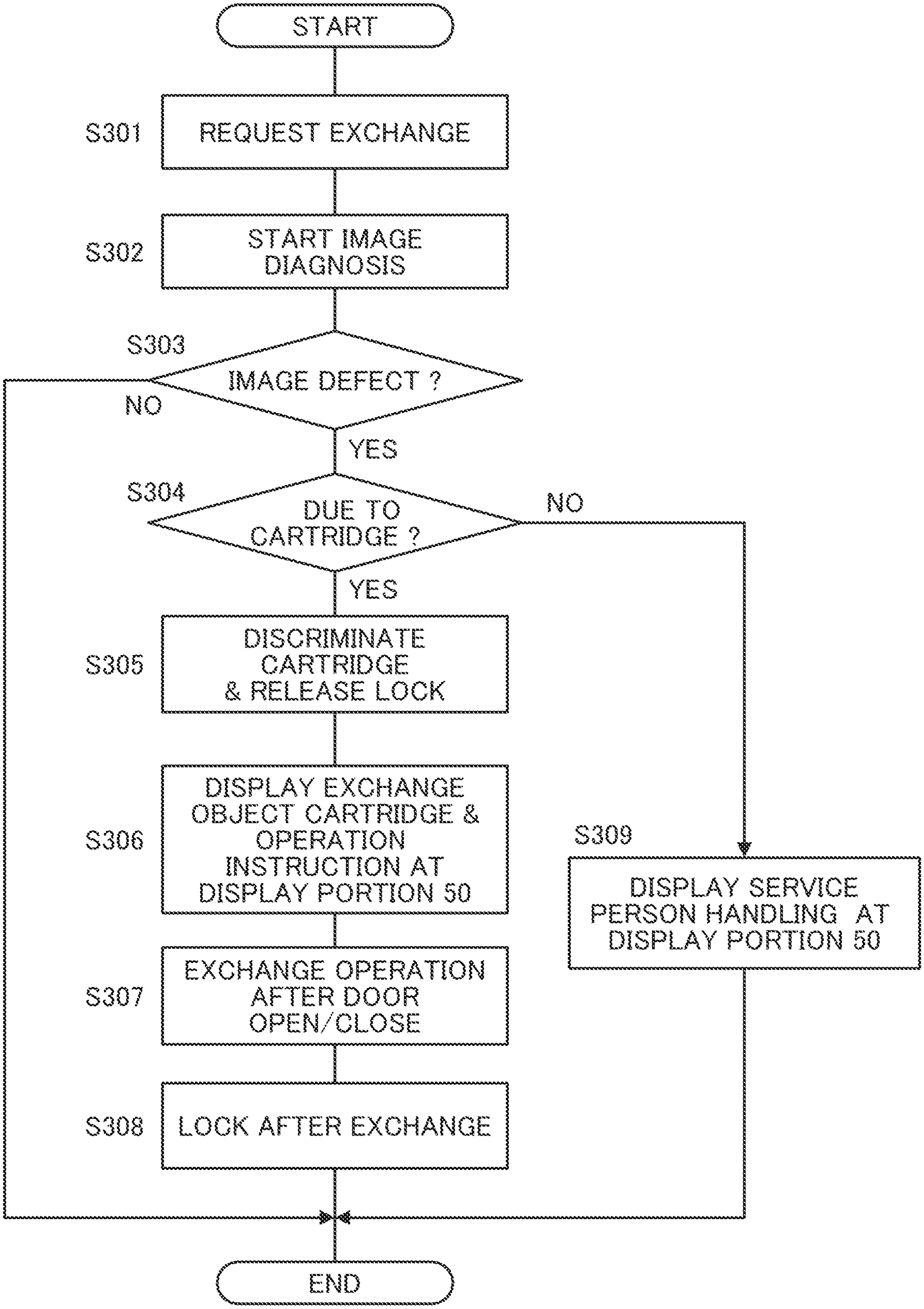

FIG. 11 is a flowchart showing processing in the embodiment 2.

Figure 12:
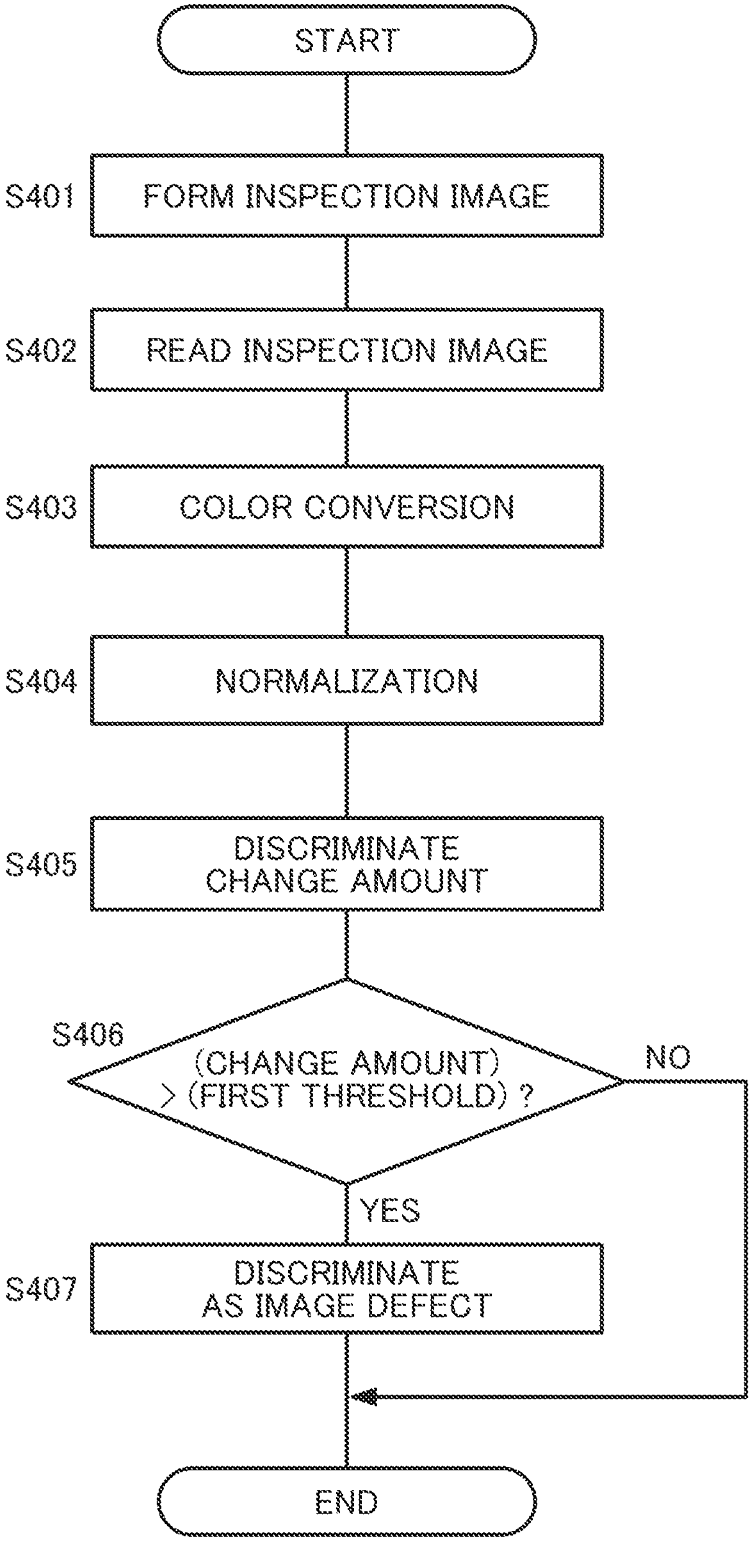

FIG. 12 is a flowchart showing an image diagnosis in the embodiment 2.

Figure 13:
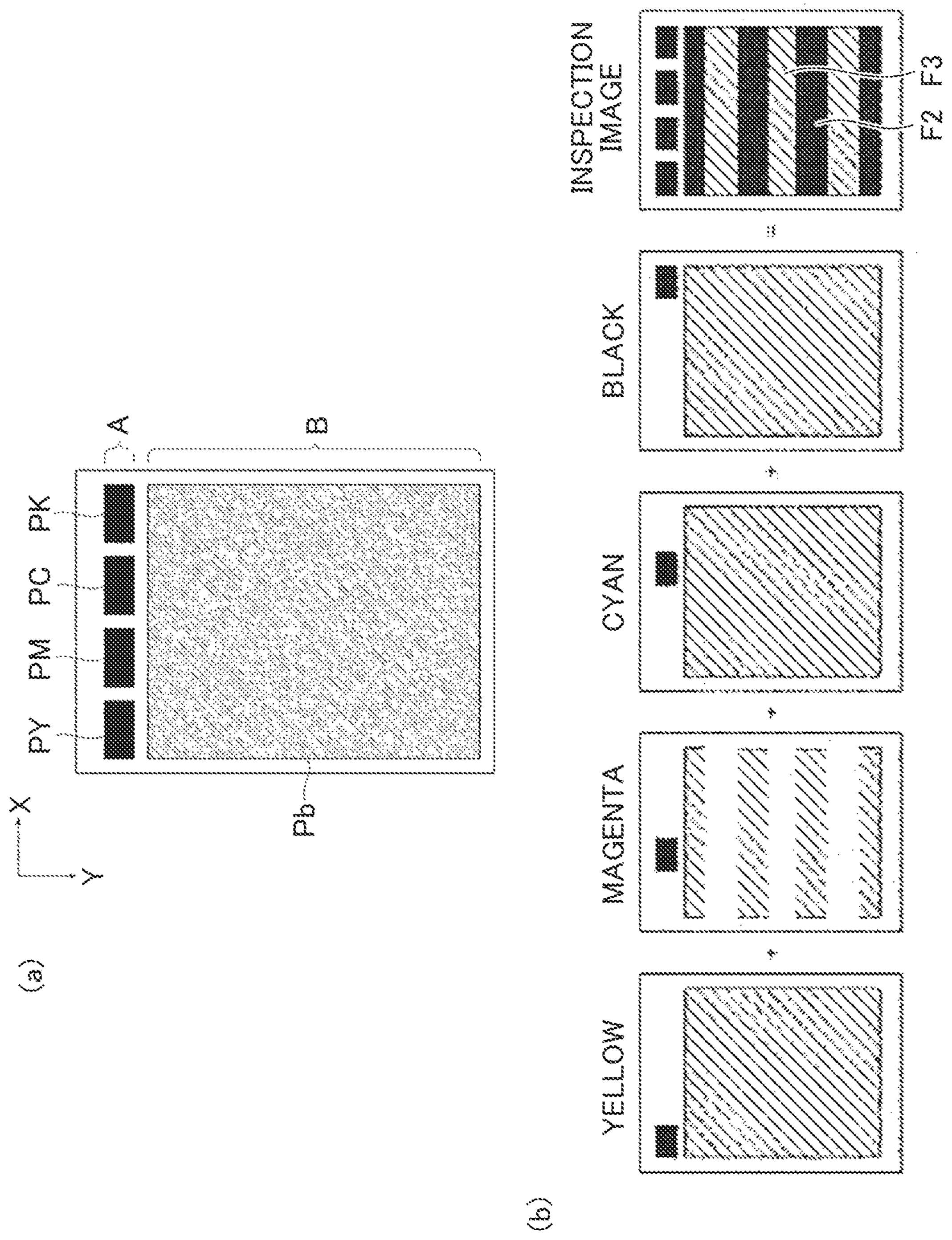

Parts (a) and (b) of FIG. 13 are schematic views showing a diagnosis image and a detection image.

Figure 14:
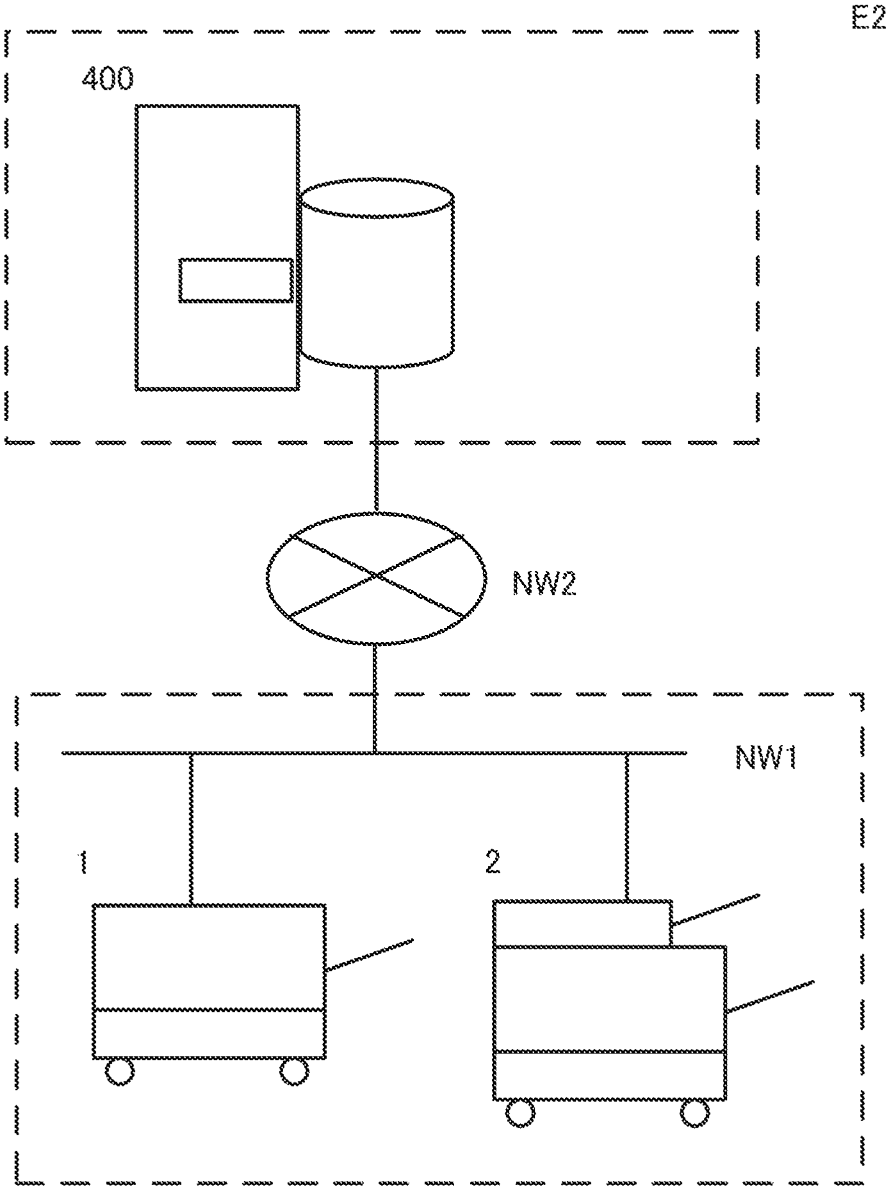

FIG. 14 is a schematic view showing a network constitution in an embodiment 3.

Figure 15:
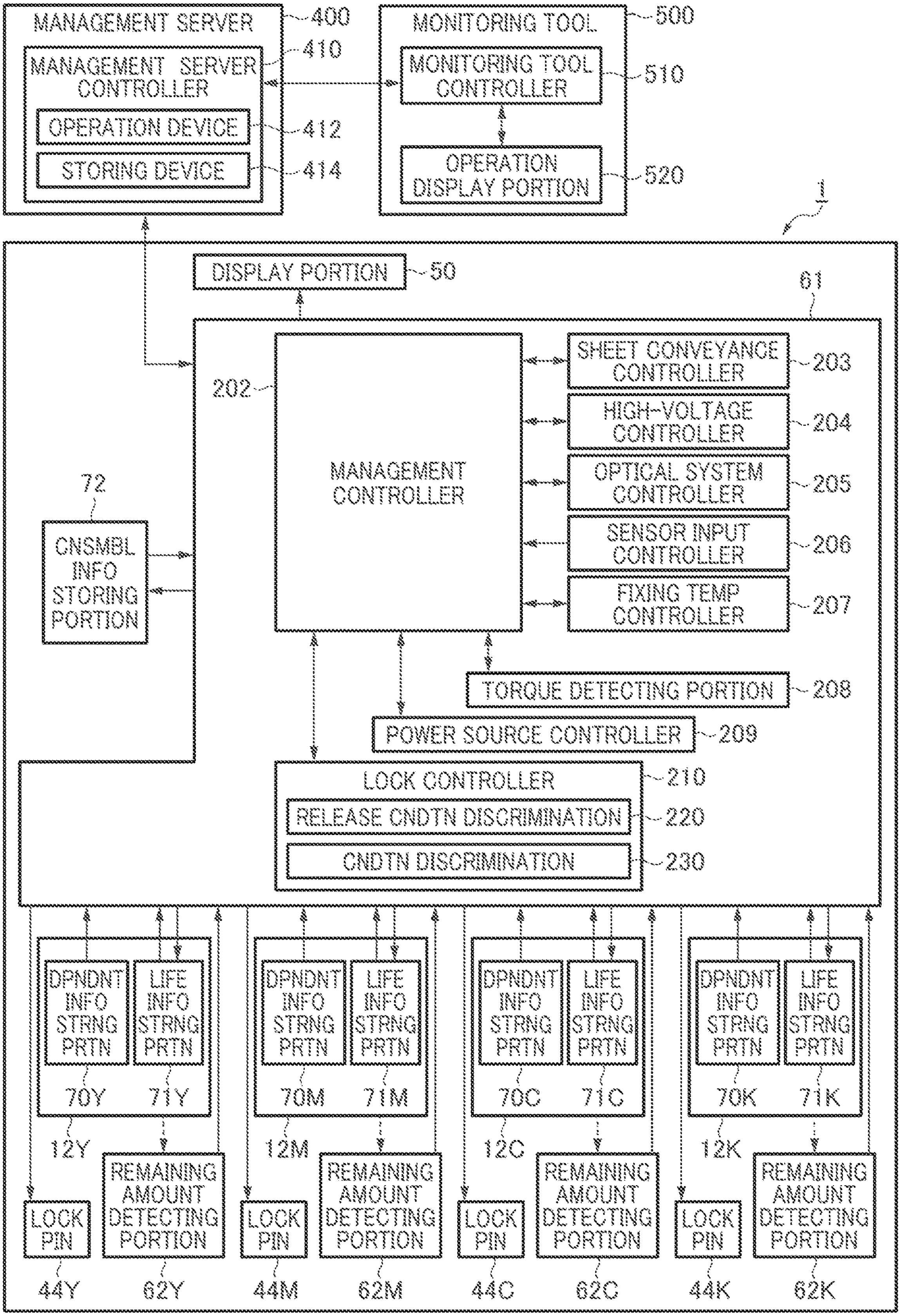

FIG. 15 is a block diagram of a control constitution in the embodiment 3.

Figure 16:
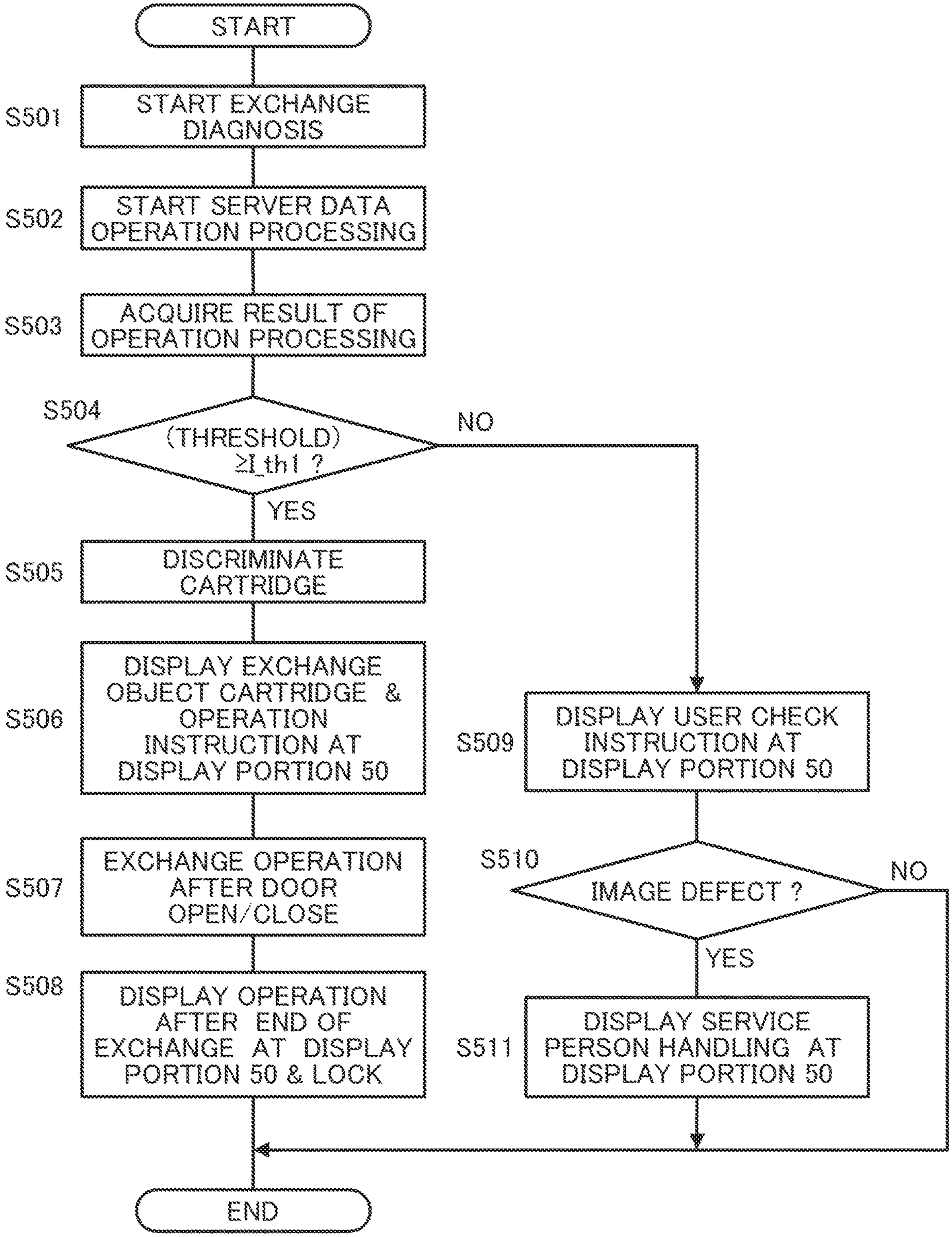

FIG. 16 is a flowchart showing processing in the embodiment 3.

Figure 17:
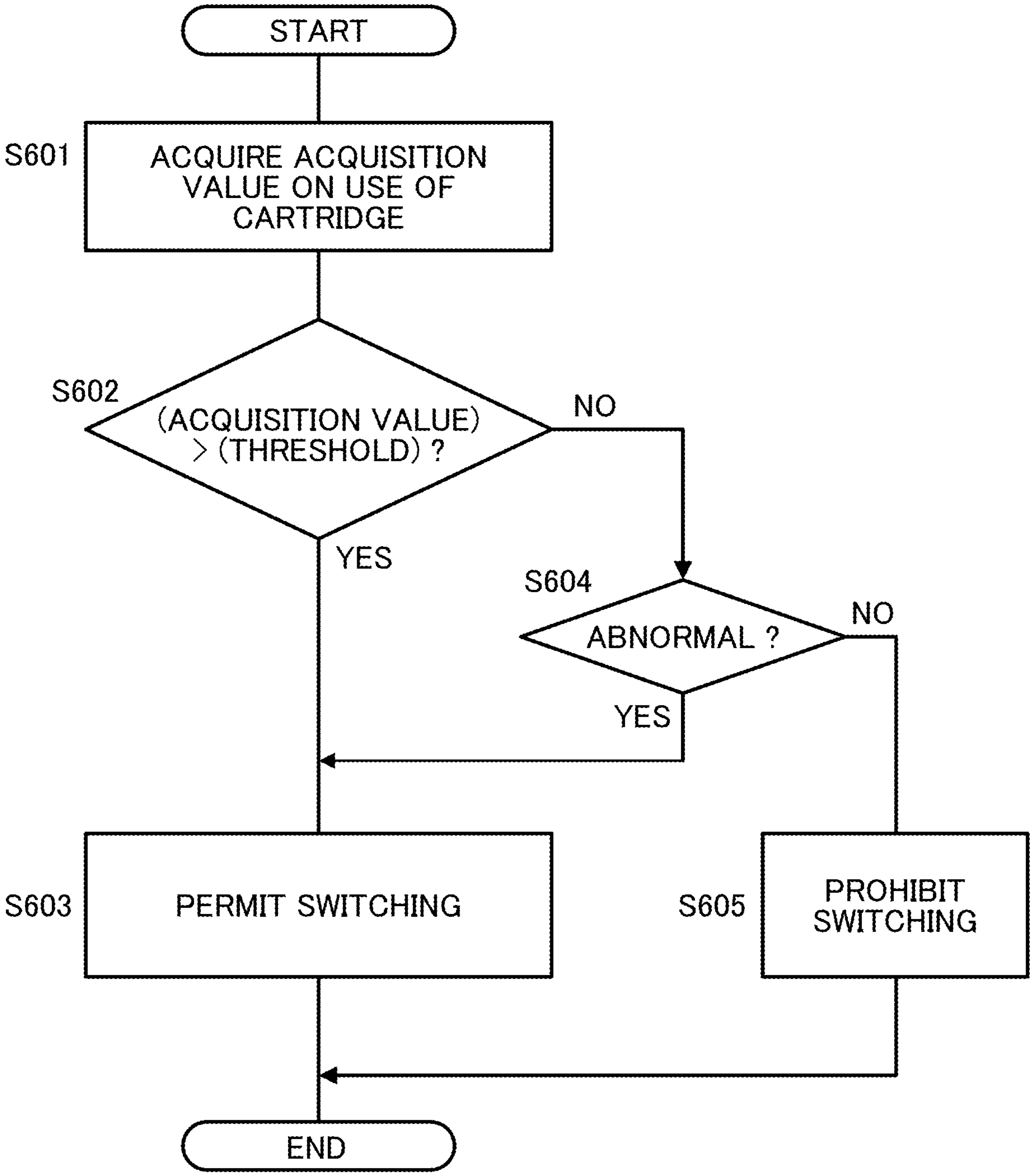

FIG. 17 is a flowchart for illustrating permission and prohibition of switching in the embodiments 1 to 3.

DESCRIPTION OF THE EMBODIMENTS

In the following, an image forming apparatus according to the present invention and an image forming system according to the present invention will be specifically described while making reference to the drawings. Incidentally, the following embodiments are not intended limit the present invention according to the appended claims. In the embodiments, a plurality of features are described, but all the plurality of features are not necessarily essentially required, and these features may also be arbitrarily combined with each other. Further, in the attached drawings, the same or similar constituent elements are represented by the same reference numerals or symbols, and redundant description will be omitted.

Embodiment 1

[Image Forming Apparatus]

Figure 1:
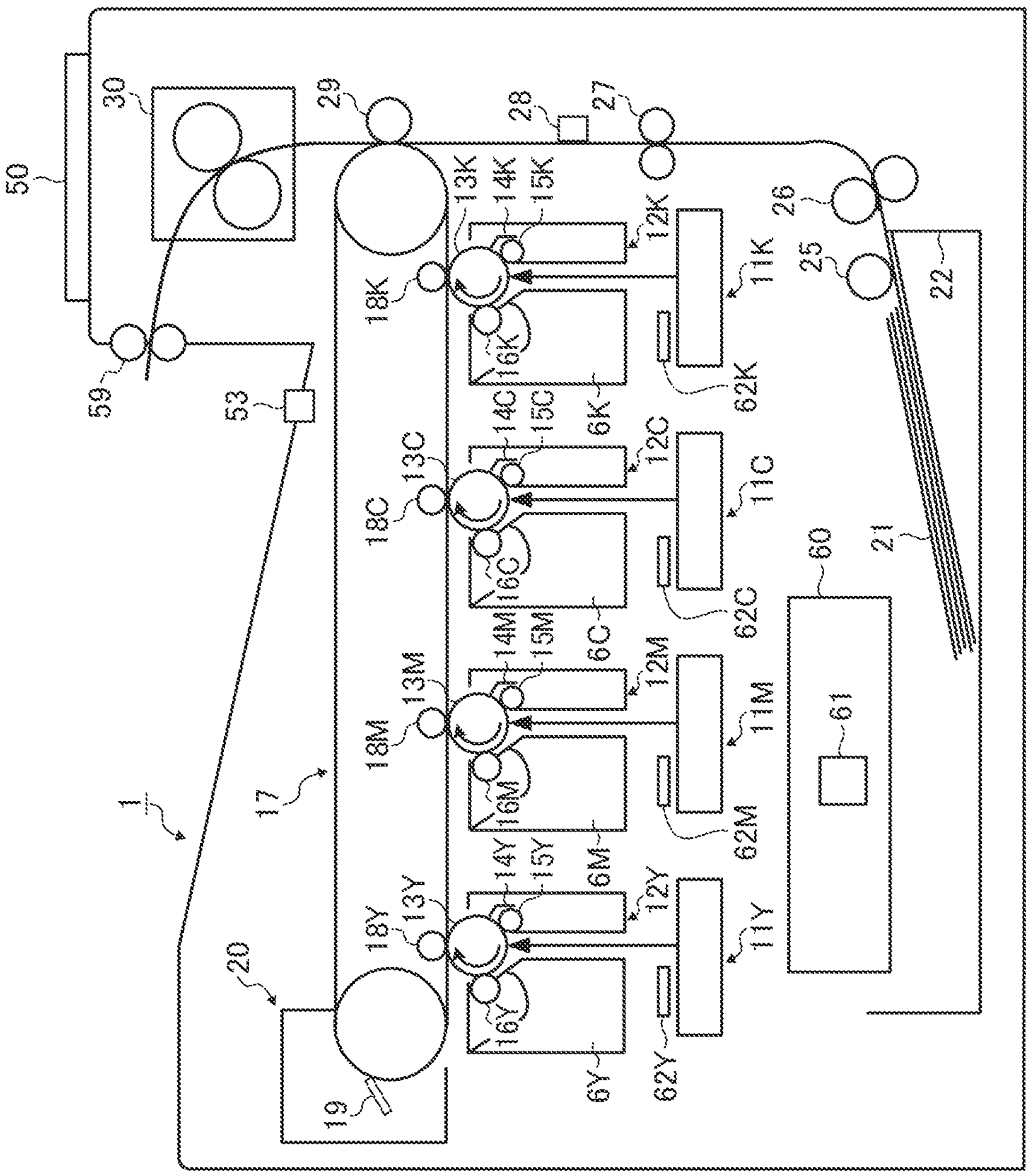
FIG. 1 is a schematic sectional view of an image forming apparatus according to an embodiment 1.

FIG. 1 is a schematic sectional view showing a general structure of a color image forming apparatus of a tandem type according to an embodiment 1. The color image forming apparatus of the tandem type is constituted so as to be capable of outputting a full-color image by superposing toners which are developers of four colors of yellow (Y), magenta (M), cyan (C), and black (K). Suffixes Y, M, C, and K of reference numerals in FIG. 1 represent the colors. Incidentally, these suffixes Y, M, C, and K will be omitted except for the case where description is made for a specific color. In order to form an image of each color, a laser scanner 11 which is an exposure means, and a cartridge 12 are provided. The cartridge 12 is constituted by a photosensitive drum 13 rotatable in an arrow direction in FIG. 1, and a drum cleaner 14, a charging roller 15, and a developing roller 16 (rotatable member) which are provided in cartridge with the photosensitive drum 13, and a toner container 6 (accommodating portion) which is an accommodating container for accommodating toner supplied to the developing roller 16. With the photosensitive drum 13, an intermediary transfer belt 17 is provided in a cartridge, and a primary transfer roller 18 is provided opposed to the photosensitive drum 13 via the intermediary transfer belt 17. Further, sheets 21 which are each a recording material are stored in a cassette 22. Along a conveying passage of the sheet 21, a feeding roller 25, a conveying roller pair 26, and a registration roller pair 27 are provided. In the neighborhood of a side downstream of the registration roller pair 27 with respect to a conveying direction of the sheet 21, a registration sensor 28 is provided. A secondary transfer roller 29 is provided in a cartridge with the intermediary transfer belt 17, and on a side downstream of the secondary transfer roller 29 with respect to the conveying direction, a fixing device 30 and a discharging roller pair 59 are provided. In the neighborhood of the discharging roller pair 59, a discharging portion paper (sheet) presence/absence sensor 53 is provided. Along the intermediary transfer belt 17, a cleaning unit 20 including a cleaning blade 19 is provided.

Next, an electrophotographic process will be described. A surface of the photosensitive drum 13 is electrically charged uniformly by the charging roller 15, and then is irradiated with laser light modulated depending on image data by the laser scanner 11, so that electric charges at a portion irradiated with the laser light are removed. By this, an electrostatic latent image is formed on the surface of the photosensitive drum 13. By the developing roller 16, charged toner is deposited on the electrostatic latent image, so that a toner image of an associated color is formed on the surface of the photosensitive drum 13. Then, the toner images formed on the surfaces of the respective photosensitive drums 13 are successively transferred superposedly onto the intermediary transfer belt 17 by the primary transfer rollers 18 (primary transfer).

On the other hand, the sheet 21 in the cassette 22 is fed by the feeding roller 25 and is conveyed to the registration roller pair 27 by the conveying roller pair 26. Then, the toner images on the intermediary transfer belt 17 are transferred onto the sheet 21 conveyed by the registration roller pair 27 (secondary transfer). An unfixed toner image on the sheet 21 is fixed by the fixing device 30, and thereafter is discharged to an outside of the image forming apparatus 1 by the discharging roller pair 59. In the neighborhood of the discharging roller pair 59, the discharging portion paper presence/absence sensor 53 for detecting the presence or absence of the sheet 21 discharged from the discharging roller pair 59 is provided. The intermediary transfer belt 17 after the transfer is cleaned by the cleaning blade 19.

Further, the image forming apparatus 1 includes a control substrate 60, a remaining toner amount detecting portion 62, which is a remaining amount detecting means, and a display portion 50. The display portion 50 is, for example, an operation panel, and is a display device for notifying a user of information from the image forming apparatus 1, and is also capable of inputting the information in addition to display of the information. On the control substrate 60, a controller 61, which is a control means for controlling the image forming apparatus 1, is provided. The controller 61 collectively controls an operation of the image forming apparatus 1, such as control of a driving source relating to conveyance of the sheet 21, control relating to the image formation, and the like. The controller 61 includes a storing portion (not shown), in which model information is stored in advance at the time of, for example, factory shipping. The remaining toner amount detecting portions 62Y, 62M, 62C, and 62K are units for detecting remaining toner amounts in the toner containers 6Y, 6M, 6C, and 6K, respectively. Incidentally, members attributing to the operation of the image forming apparatus 1 until the image is formed on the sheet 21 are included in the image forming portion.

[Mounting Constitution of Cartridge]

Figure 2:
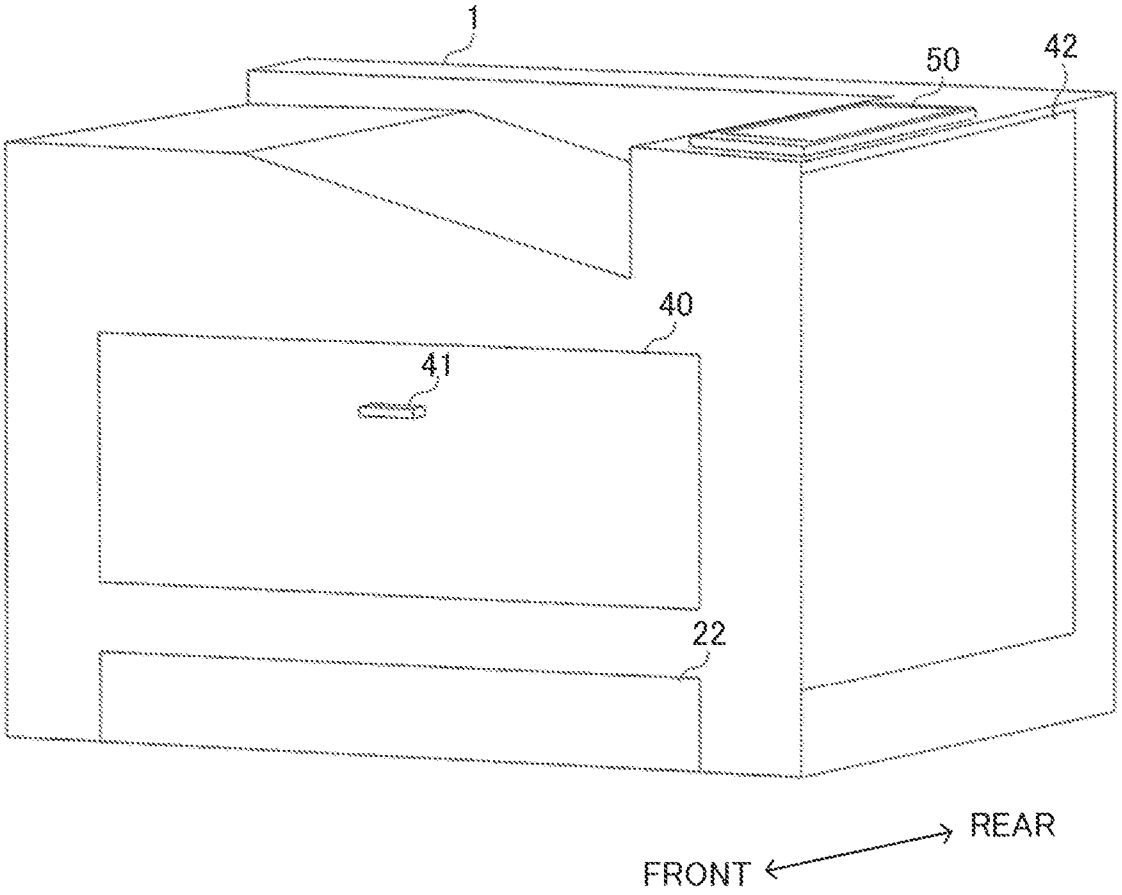
FIG. 2 is a perspective view of a door of the image forming apparatus of the embodiment 1.

Next, a mounting constitution of the cartridge 12 in the embodiment 1 will be described using FIGS. 2 and 3. FIGS. 2 and 3 are schematic perspective views of a printer as the image forming apparatus 1 to which the cartridge 12 is detachably mountable. Incidentally, as shown in FIGS. 2 and 3, a side where a door 40 (described later) is provided is a front side, and a side opposite from the front side is a rear side. The cartridge 12 (toner container 6) is an example of a unit capable of being exchanged by being detached from and attached to the image forming apparatus 1, and a unit which is a new article is mounted in the image forming apparatus 1 and use thereof advances, and then the unit is exchanged when a time of the use of the unit reaches an exchange (replacement) time (hereinafter, this time is referred to as a "lifetime"). The exchange time is a time when a predetermined image quality or the like cannot be maintained in the case where the image is formed with use of the unit, or the like time. FIG. 2 is the perspective view when a first door 40 (hereinafter, referred to as the door 40) (openable member), which is provided to the image forming apparatus 1 for exchanging the cartridge 12 and which is movable for opening and closing an opening through which the cartridge 12 passes, is in a position (closed position) where the door 40 closes the opening. Here, the door 40 is a door to which the user has access in order to take out the cartridge 12 from an inside of the image forming apparatus 1. An operating member 41 is a member operated by the user in order to open and close the door 40. A second door 42 (hereinafter, referred to as the door 42) is a door to which the user has access in order to perform jam clearance for removing the sheet 21 stagnated in the case where the sheet 21 is jammed during the conveyance of the sheet 21, or the like case.

(Locking Mechanism of Cartridge)

Part (a) of FIG. 3 is the perspective view when the door 40 is in a position (control position) where the door 40 opens the opening. A door 40 portion is opened by moving the door 40 in an arrow direction in part (a) of FIG. 3 through an operation of the operating member 41 in the state of FIG. 2. In the following, the locking mechanism (switching mechanism) will be described. Locking members 43Y, 43M, 43C, and 43K are members for locking taking out of the cartridges 12Y, 12M, 12C and 12K, respectively. Locking pins 44Y, 44M, 44C, and 44K are pins for restricting positions of the locking members 43Y, 43M, 43C, and 43K, respectively. Each locking pin 44 is capable of switching between a projected state and a recessed state by a solenoid (not shown). The projected state is a state in which the locking pin 44 is projected further toward a front side of the image forming apparatus 1 than the locking member 43 is, and the recessed state is a state in which the locking pin 44 is not projected toward the locking member 43 side. Here, when the locking pin 44 is in the projected state, the locking member 43 is fixed to a position of a first state in which lock of the cartridge 12 is carried out so that the cartridge 12 cannot be taken out (taking-out prohibition) (hereinafter, this first state is referred to as a locking execution state). By this, a state in which the user cannot take out the cartridge 12 is formed.

Part (b) of FIG. 3 is the perspective view showing the recessed state of the locking pin 44Y, and in this case, the locking member 43Y is capable of moving to a position where the cartridge 12 can be taken out (removable) by rotation (hereinafter, this position is referred to as a removable position). A state of part (b) of FIG. 3 is a second state in which the lock of the yellow cartridge 12Y is released (hereinafter, this second state is referred to as a lock-released state). The user is capable of taking out the cartridge 12Y from the image forming apparatus 1 by pulling out the cartridge 12Y in a thick arrow direction (front side) in part (b) of FIG. 3. As shown in part (a) of FIG. 3, in this constitution, only by putting the door 40 in an open state, the cartridge 12 cannot be taken out from the image forming apparatus 1. As shown in part (b) of FIG. 3, in the case where the door 40 is in an opened state and the locking pin 44 is in the recessed state, the cartridge 12 is capable of being taken out in a front surface (front) direction (arrow direction) of the image forming apparatus 1.

The locking pin 44 is controlled by the controller 61, and the controller 61 is constituted so as to switch between a state in which the taking-out of the cartridge 12 is permitted (hereinafter, this state is referred to as taking-out permission) and a state in which the taking-out of the cartridge 12 is prohibited (hereinafter, this state is referred to as a taking-out prohibition). As described above, the image forming apparatus 1 of FIG. 3 includes the plurality of cartridges 12 (toner containers 6) and a single door 40 put in an open position or a closed position. The locking mechanism is provided for each of the cartridges 12, and is in a released state (unlocked state) so that the cartridge 12 can be taken out when the cartridge 12 is exchanged. On the other hand, the locking mechanism is in a locked state so that the cartridge 12 cannot be taken out when the cartridge 12 is not exchanged. Here, the locking mechanism includes the locking member 43 and the locking pin 44. The locking mechanism is a switching mechanism capable of switching between a restricted state in which detachment of the cartridge 12 from the apparatus main assembly is restricted and a non-restricted state in which the detachment of the cartridge 12 from the apparatus main assembly is not restricted. The controller 61 controls the released state and the locked state of the locking mechanism.

[Control Constitution]

FIG. 4 is a block diagram of a control constitution. The controller 61 is constituted by a CPU or the like and carries out information management of the cartridge 12, lifetime management of the cartridge 12, and control of switching between execution and release of the lock (locking). A management controller 202 includes a one-chip microcomputer (not shown) in which memories such as a ROM and a RAM are incorporated, and carries out control of managing operations of respective portions of a printer engine. A sheet conveying controller 203 executes drive of the feeding roller 25 for feeding the sheet 21, and rotation and a stop of the rotation of the conveying roller pair 26 for conveying the sheet 21 in accordance with an instruction of the management controller 202. A high-voltage controller 204 executes output control of high voltages for the charging, the development, and the transfer on the basis of an instruction of the management controller 202. An optical system controller 205 executes drive/stop at the drive of a scanner motor (not shown) of the laser scanner 11 and flickering of a laser in accordance with an instruction of the management controller 202. A sensor input controller 206 outputs, to the management controller 202, pieces of information (detection results) detected by the registration sensor 28 and the discharging portion paper presence/absence sensor 53. A fixing temperature controller 207 controls a temperature of the fixing device 30 to a temperature designated by the management controller 202. A power source controller 209 supplies electric power necessary for the respective controllers and stops the supply of the electric power during power on and off, during a shift to a power-saving mode or during restoration from the power-saving mode. Incidentally, the power-saving mode is a mode in which the image forming apparatus 1 operates with electric power mode lower than electric power consumed by the image forming apparatus 1 during the image formation.

A lock controller 210 executes the information management of the cartridge 12 and the lifetime management of the cartridge 12. The lock controller 210 includes a lock condition discrimination controller 230 and a lock release condition discrimination controller 220. The lock condition discrimination controller 230 carries out discrimination as to whether or not a lock execution condition is satisfied and execution of lock(ing) of the consumables. The lock release condition discrimination controller 220 carries out discrimination as to whether or not a lock-releasing condition is satisfied and release of the lock. The lock controller 210 including the lock condition discrimination controller 230 and the lock release condition discrimination controller 220 functions as a discrimination means for discriminating whether or not the lock is executed or whether or not the lock is released.

The cartridge 12 includes a dependent information storing portion 70 for storing consumable dependent information and a lifetime information storing portion 71 for storing consumable lifetime information. The consumable dependent information is information indicating, for example, a serial number or the like uniquely determined for each cartridge 12. The consumable lifetime information is information indicating, for example, a lifetime of each cartridge 12. Each of the dependent information storing portion 70 and the lifetime information storing portion 71 is connected to the lock controller 210 when the associated cartridge 12 is mounted in the image forming apparatus 1.

A consumable information storing portion 72 which is a first storing means is provided in the image forming apparatus 1 and is a non-volatile storing means for storing contents of the dependent information storing portion 70 and the lifetime information storing portion 71.

The consumable information storing portion 72 is used for detecting that the cartridge 12 is exchanged.

The display portion 50 is used for notifying the user of a state of the printer (for example, a printable state, a state in which the cartridge 12 reaches an end of a lifetime thereof, or the like) and an exchange open of the cartridge 12. The controller 61 functions as a notifying portion for notifying the user of first information on the lifetime or the exchange of the cartridge 12 and second information on abnormality of the cartridge 12. Further, the display portion 50 also has a function of, for example, a touch panel, and the user is capable of inputting and setting predetermined information by touching a predetermined portion of a screen displayed at the display portion 50.

[Consumable Dependent Information and Consumable Lifetime Information]

In a table 1, contents stored in the dependent information storing portion 70Y which is a second storing means are shown. In a table 2, contents stored in the lifetime information storing portion 71Y are shown. The tables 1 and 2 are tables each storing items in a first column and values corresponding to the items. The storing contents of the dependent information storing portion 70Y are a serial number ("Serial No.") intrinsic to each cartridge 12, a model information of the image forming apparatus 1 in which the cartridge 12 is used, and cartridge color information indicating a color of the cartridge 12. The storing contents are not updated by the controller 61 (specifically, the lock controller 210). For example, in the dependent information storing portion 70Y for yellow, information such that the serial No. is "12345", the model information is "LBPXXXX", and the cartridge color information is "Y" is stored.

TABLE 1

| ITEM | VALUE |
|---|---|
| Serial No. | 12345 |
| Model information | LBPXXXX |
| Cartridge color information | Y |

In the lifetime information storing portion 71Y, a lifetime discrimination rotation time of the photosensitive drum 13Y and a rotation integration time of the photosensitive drum 13Y are stored (held). The rotation integration time of the photosensitive drum 13Y is integrated during the rotation of the photosensitive drum 13 during the operation of the image forming apparatus 1, and is updated whenever necessary. The controller 61 calculates a remaining lifetime relating to the rotation time of the photosensitive drum 13 by using values of the lifetime discrimination rotation time and the rotation integration time. For example, in the table 2, the lifetime discrimination rotation time of the photosensitive drum 13Y is stored as 10000 sec, and the rotation integration time is stored as 6000 sec. For this reason, when a use amount is represented by %, the use amount is $6000/10000\times 100=60\%$, so that a remaining lifetime of the photosensitive drum 13 is 40% (=100%−60%).

TABLE 2

| ITEM | VALUE |
|---|---|
| LDRT*[1] | 10000 sec |
| RIT*[2] | 6000 sec |
| LDRD*[3] | 5000 m |
| RID*[4] | 3500 m |
| RA*[5] | 25% |
| LRRA*[6] | 5% |

*[1]"LDRT" is the lifetime discrimination rotation time of the photosensitive drum 13Y.
*[2]"RIT" is the rotation integration time of the photosensitive drum 13Y.
*[3]"LDRD" is the lifetime discrimination rotation distance of the photosensitive drum 13Y.
*[4]"RID" is the rotation integration distance of the photosensitive drum 13Y.
*[5]"RA" is the remaining amount of the toner container 6Y.
*[6]"LRRA" is the lock release remaining amount of the cartridge 12Y.

In the lifetime information storing portion 71Y, a lifetime discrimination rotation distance of the photosensitive drum 13Y and a rotation integration distance of the photosensitive drum 13Y are stored (held). The rotation integration distance of the photosensitive drum 13Y is integrated during the rotation of the photosensitive drum 13 during the operation of the image forming apparatus 1, and is updated whenever necessary. The controller 61 calculates a remaining lifetime relating to the rotation distance of the photosensitive drum 13 by using values of the lifetime discrimination rotation distance and the rotation integration distance. For example, in the table 2, the lifetime discrimination rotation distance of the photosensitive drum 13Y is stored as 5000 m (meters), and the rotation integration distance is stored as 3500 m. For this reason, when a use amount is represented by %, the use amount is 3500/5000×100=70%, so that a remaining lifetime of the photosensitive drum 13 is 30% (=100%−70%).

Further, the remaining amount of the toner container 6Y in the table 2 is a toner remaining amount of the toner in the toner container 6Y detected by the remaining toner amount detecting portion 62Y and is stored whenever necessary. As a general technique, the toner remaining amount is calculated by integrating the number of pixels of the image formed by an associated one of the laser scanners 11Y, 11M, 11C, and 11K. Incidentally, the toner remaining amount may also be acquired by another method. In the table 2, a minimum (smallest) value of three remaining amounts (remaining lifetimes) consisting of a remaining lifetime acquired using the rotation integration time, a remaining amount acquired using the rotation integration distance, and the toner remaining amount is a remaining amount of the cartridge 12Y. Incidentally, information indicating the minimum value of the three remaining lifetimes is hereinafter referred to as minimum (shortest) lifetime information (acquisition value on the use amount of the cartridge).

In an example of the table 2, a remaining lifetime is acquired as 40% from the rotation integration time, a remaining lifetime is acquired as 30% from the rotation integration distance, and the toner remaining amount is acquired as 25%. From this, the controller 61 regards the remaining lifetime as the minimum lifetime information, and the minimum lifetime information is set to 25%. Thus, the controller 61 functions as an acquiring portion for acquiring the minimum lifetime information from a plurality of pieces of the lifetime information which are stored in the lifetime information storing portion 71 for the cartridges 12 and which are acquired by different means, and discriminates the acquired minimum lifetime information as a lifetime of the associated cartridge 12. Incidentally, in the embodiment 1, the lifetime of the cartridge 12 was discriminated from a plurality of pieces of information, specifically on the basis of the rotation integration time, the rotation integration distance, and the toner remaining amount. However, for example, on the basis of one type of information, specifically one of the rotation integration time, the rotation integration distance, and the toner remaining amount, the lifetime of the cartridge 12 may also be discriminated. Further, other information may be used when the information correlates with the lifetime of the cartridge 12.

The lock release remaining amount of the cartridge 12Y is a set value preliminarily set for the remaining amount in order to release the locking mechanism in the case where the remaining amount of the cartridge 12 becomes smaller than this value (hereinafter, this value is referred to as a remaining amount set value). In the case where the remaining lifetime of the cartridge 12Y becomes the lock release remaining amount or less, the controller 61 performs the release of the locking mechanism. The controller 61 functions as a first discriminating means for discriminating that a timing is a timing when the toner (cartridge) is exchanged in the case where the amount of the toner accommodated in the toner container 6 becomes smaller than the remaining amount set value set in advance. In the example of the table 2, in the case where the minimum lifetime information becomes 5% or less, the controller 61 performs the release of the locking mechanism. This is also true for other colors, and therefore description thereof will be omitted. The case where the controller 61 discriminates that a time is an exchange time of the cartridge 12 on the basis of the minimum lifetime information and the lock release remaining amount and then releases the lock of the locking mechanism is hereinafter referred to as locking mechanism release. Thus, the controller 61 acquires the lifetime (use amount) of the cartridge 12 on the basis of at least one of the rotation time of the photosensitive drum 13, the rotation distance of the photosensitive drum 13, and the number of pixels of the image data.

[Consumable Information Storing Portion]

In a table 3, pieces of information stored in the consumable information storing portion 72 are shown. In the consumable information storing portion 72, pieces of information selected from pieces of information stored in the storing portions 70 and 71 for the respective cartridges 12 are stored. In this embodiment, serial numbers for comparison, locked states of the respective locking mechanisms, and the minimum lifetime information are stored.

TABLE 3

| | Item | Value |
|---|---|---|
| Y | SN*[1] | 12345 |
| | LS*[2] | Lock execution |
| | MLI*[3] | 25% |
| M | SN*[1] | 67890 |
| | LS*[2] | Lock execution |
| | MLI*[3] | 25% |
| C | SN*[1] | 98765 |
| | LS*[2] | Lock execution |
| | MLI*[3] | 25% |
| K | SN*[1] | 5555 |
| | LS*[2] | Lock execution |
| | MLI*[3] | 25% |

*[1]"SN" is the serial No.
*[2]"LS" is the locked state.
*[3]"MLI" is the minimum lifetime information.

The table 3 is a table in which colors are stored in a first column, items corresponding to the colors are stored in a second column, and values corresponding to the items are stored in a third column. For example, as regards the yellow (Y), as the serial No., information of, for example, "12345"

read from the dependent information storing portion 70% is stored. Further, as the locked state, information ("Lock execution" or "Lock release") when the controller 61 controls the locking mechanism is stored, for example, information of "Lock execution" is stored. Further, as the minimum lifetime information, information of "25%" read from the lifetime information storing portion 71Y is stored.

[Control of Execution and Release of Locking Mechanism During Image Formation]

Here, a processing method of the locking mechanism by the controller 61 will be described using a flowchart of FIG. 5. The flowchart of FIG. 5 shows a flow of locking mechanism releasing processing in which the locking mechanism is released in the case where the remaining lifetime of the cartridge 12 becomes the lock release remaining amount or less (predetermined value or less) during the image formation.

When the controller 61 receives an instruction of image formation, the controller 61 starts processing at a step(S) 101 and later. In S101, the controller 61 carries out the image formation. In S102, the controller 61 causes the lock controller 210 to discriminate whether or not the remaining lifetime of at least one of the cartridges 12 reaches a reference of the release of the locking mechanism during or after the image formation by making reference to the information of the table 2 stored in the lifetime information storing portion 71. Here, a time when the remaining lifetime of the cartridge 12 reaches the reference of the release of the locking mechanism is a time when the cartridge 12 reaches an end of the lifetime thereof. In the case where the controller 61 causes the lock controller 210 to discriminate in S102 that the remaining lifetime reaches the reference, the controller 61 causes the processing to go to S103. In the case where the controller 61 causes the lock controller 210 to discriminate in S102 that the remaining lifetime does not reach the reference, the controller 61 causes the processing to go to S106. For example, the controller 61 causes the lock controller 210 to discriminate in S102 that the remaining lifetime is 25% from the minimum lifetime information of the table 3 and that the reference is 5% from the lock release remaining amount of the table 2, for the yellow cartridge 12Y. The lock controller 210 compares these values, and discriminates that the yellow cartridge 12Y does not reach the reference.

In S103, the controller 61 causes the locking pin 44 to be put in the recessed state, for the cartridge 12 is discriminated by the lock controller 210 as that the remaining lifetime reached the reference of the release of the locking mechanism, and thus releases the lock. For example, in the case where the remaining lifetime of the yellow cartridge 12Y was 5% or less in terms of the lock release remaining amount, the lock controller 210 puts the locking pin 44Y in the recessed state.

In S104, the controller 61 causes the lock controller 210 to store information (for example, "Lock release" or the like) indicating a lock-released state, as the locked state of the cartridge 12 discriminated that the cartridge 12 reached the end of the lifetime thereof in the table 3, in the consumable information storing portion 72. In S105, the controller 61 causes the display portion 50 to display the following information. The controller 61 causes the display portion 50 to not only notify that the cartridge 12 has reached the end of the lifetime but also display information (exchange instruction or the like) prompting the user to exchange the cartridge 12 that has reached the end of the lifetime with a new cartridge (hereinafter, referred to as a fresh cartridge), and then causes the processing to go to S106. In S106, the controller 61 discriminates whether or not there is a subsequent image forming instruction. In the case where the controller 61 discriminated that the image forming instruction is provided, the controller 61 causes the processing to return to S101, and in the case where the controller 61 discriminated that the image forming instruction is not provided, the controller 61 ends the processing.

Thus, in the case where the cartridge 12 reaches a predetermined lifetime or less, the lock of the cartridge 12 is released. By this, a constitution in which an occurrence of unnecessary cost due to erroneous exchange with another cartridge, for example, a fresh cartridge in the case where some of the lifetime of the cartridge 12 remains is prevented is realized.

[Exchange Object Unit Discrimination and Locking Mechanism Release by Abnormality Detection of Cartridge]

In the embodiment 1, as a detecting method of detecting abnormality of the cartridge 12 (toner container 6), the case where a driving torque detection of the cartridge 12 is performed will be described. As described above, in general, the lock of the cartridge 12 is released in the case where the lifetime of the cartridge 12 becomes the predetermined lifetime or less.

However, depending on a use environment or a use condition in which the abnormality of the cartridge 12 occurs due to a factor other than the above-described rotation integration distance, the rotation integration time, and the toner remaining amount, and thus the case where an image defect occurs and the user requires the exchange of the cartridge 12 would be assumed. That is, on the basis of the above-described three pieces of information, the exchange of the cartridge 12 is required by the user although the timing does not reach the exchange timing in terms of a value of either one of the above-described three pieces of information. In the embodiment 1, as one of the abnormalities of the cartridge 12, abnormality of the driving torque is detected. Further, a constitution in which in the case where the user requires the exchange of the cartridge 12, the cartridge 12 for which the abnormality occurs is specified and then the lock of the cartridge 12 which is an exchange object is released even at a timing before the lifetime of the cartridge 12 reaches the end of the lifetime due to the conventional factors is employed.

Here, specifically, during the image forming operation, occurrence or non-occurrence of the abnormality is detected by periodically monitoring a maximum value and an average value of a driving torque value of the cartridge 12 during an actuation operation or the like, and an average torque value during normal printing. In the following, details will be described. A torque detecting portion 208 which is a detecting portion (torque detecting portion, current detecting portion) detects a torque of a driving motor (not shown) for the cartridge 12. Specifically, a current detecting device (not shown) connected to the driving motor for the cartridge 12 is used. The torque detecting portion 208 measures a current (detection value, current value) flowing through the driving motor under control of the management controller 202, so that the torque of the driving motor is detected, and a detection result is outputted to the controller 61 and then is stored in the ROM whenever necessary. In the embodiment 1, the cartridges 12Y, 12M, 12C, and 12K for Y, M, C, and K are driven by associated driving motors (not shown), respectively, and torques of the respective driving motors (not shown) are independently detected. On the basis of values of the torques of the driving motors detected by the torque detecting portion 208, the controller 61 predicts (discriminates) whether or not the cartridges 12 cause the abnormality.

[Torque]

FIG. 6 is a graph showing a relationship between a progression of the torque (detected current) due to progression of use of the cartridge 12 and a threshold current (I_th) for abnormality discrimination, in which a result of the detected current relative to a page count is shown. In the graph of FIG. 6, the abscissa represents the page count, and the ordinate represents the detected current (mA). Further, the threshold current (I_th) for the abnormality discrimination and lifetime arrival are also shown. The page count is an example of information showing that the use of the cartridge 12 progresses. A plot of a solid line shows the progression of the torque during a normal operation in which no abnormality occurs, and within a conventional lifetime, the detected current is kept at a value which is the threshold current (I_th) or less. The plot of the solid line shows a state in which there is no occurrence of torque abnormality and thus a good image is capable of being formed.

On the other hand, a plot of a broken line is an example of the case where the torque increases with progression of the use of the cartridge 12, and in this case, the torque abruptly increases in the second half of a period until the lifetime of the cartridge 12 reaches the end of the lifetime. The increase itself in torque occurring with the progression of the user of the cartridge 12 does not cause failure of the device soon, and normally has no influence. However, depending on a factor of the torque increase, even within the lifetime (less than lifetime arrival), the case where a phenomenon such as a stripe image due to improper cleaning, a development stripe due to a lowering in developing property, and an image defect due to a lowering in charging property would be assumed. Here, in the factor of the torque increase, for example, abrasion of a blade, a sliding resistance of a roller, contamination of the various rollers, and the like are included.

In this embodiment, the case where abnormality discrimination of the cartridge 12 is executed when the user recognizes some image defect within the lifetime of the cartridge 12 and then requests the exchange of the cartridge 12 will be described. Specifically, the controller 61 compares a threshold current I_th1 for abnormality discrimination of the cartridge 12 stored in advance in the ROM with a present detected current I, and thus discriminates whether or not the cartridge 12 is in an abnormality state. In the embodiment 1, the present detected current I refers to a value calculated from a moving average of data corresponding to the last 100 jobs. The controller 61 compares this detected current I with the threshold current I_th1, and in the case where a present torque value is not less than a threshold for abnormality value discrimination, the controller 61 discriminates that the cartridge 12 is in an exchangeable state. The controller 61 functions as a second discriminating means for specifying the cartridge 12 causing the abnormality in the case where discrimination that the abnormality occurs is made in such a manner that in the case where the user requires the exchange of the cartridge 12, the controller 61 discriminates occurrence or non-occurrence of the abnormality of the cartridge 12 on the basis of a detection result of the torque detecting portion 208. Specifically, the controller 61 discriminates that the abnormality occurs in the case where the current detected by the torque detecting portion 208 becomes not less than the threshold current set in advance (abnormality detection). Incidentally, a calculating method of the detected current I is not limited thereto, but the detected current I may also be acquired by another method using the number of data used for calculation. For example, the detected current I may only be required to be appropriately set by a print volume or the like of the image forming apparatus 1.

Incidentally, a torque measuring method is not limited to the above-described method. For example, a method using a strain gauge, a method using a magnetometric sensor, a method using an acceleration sensor, an optical method, a method using a torsion sensor, a method using a piezoelectric element, and the like method may be used. In the method using the strain gauge, the strain gauge is stuck to a rotatable portion, and a torque is measured on the basis of a deformation amount of the strain gauge deformed by application of the torque. In the method using the magnetometric sensor, the magnetometric sensor is mounted on a rotatable portion, and a torque is measured on the basis of a change in magnetic field. In the optical method, a reflection plate is mounted on a rotatable portion, and a torque is measured by detecting light, reflected from a light source, by a light receiving device. In the method using the acceleration sensor, the acceleration sensor is mounted on a rotatable portion, and a torque is measured on the basis of a change in acceleration. In the method using the torsion spring, the torsion spring is provided on each of a rotatable member and a detecting portion, and when the rotatable member is rotated, deformation generating in the torsion spring is detected and thus the torque is measured. In the method using piezoelectric element, a voltage generated by exerting stress on the piezoelectric element under application of a torque to a rotatable member is detected, and thus the torque is measured. Whether to measure the torque with use of which method may only be required to be determined depending on a shape, a size, measurement accuracy, and the like of the rotatable portion (member) of a detection object.

[Exchange Diagnosis Processing During Cartridge Exchange Requirement by User]

A flowchart of FIG. 7 shows a flow of abnormality detection (exchange diagnosis) of the cartridge 12 in the case where the user requests (requires) the exchange of the cartridge 12. The controller 61 starts processing of S201 and later in the case where the user executes exchange diagnosis of the cartridge 12 by operating the display portion 50 (operation panel).

In S201, the controller 61 receives the exchange diagnosis of the cartridge 12, and starts the exchange diagnosis. In S202, the controller 61 makes reference to a detection result of the torque detecting portion 208, specifically a current detection result (current detection data). In S203, the controller 61 compares the detected current I with the threshold current I_th1. The controller 61 discriminates whether or not the detected current I is not less than the threshold current I_th1. In this case, the controller 61 compares the detected current I with the threshold current I_th1 for each of the cartridges 12 for Y, M, C, and K, and discriminates whether or not the detected current I is not less than the threshold current I_th1 for each of the cartridges 12 for Y, M, C, and K.

In S203, in the case where the controller 61 discriminated that at least one of the cartridges 12 for which the detected current I is not less than the threshold current I_th1 exists, the controller 61 causes the processing to go to S204. On the other hand, in S203, in the case where the controller 61 discriminated that there is no cartridge 12 for which the detected current I is not less than the threshold current I_th1, the controller 61 causes the processing to go to S208.

In S204, the controller 61 discriminates an exchangeable cartridge 12 (relevant cartridge). In S205, the controller 61 causes the display portion 50 (operation panel) to display the exchangeable (exchange object) cartridge 12 and guidance of an operation when the exchange is executed (operation instruction). In S206, the controller 61 releases the locking pin 44 of the relevant cartridge 12. The user successively executes door lock release in accordance with the operation, and then executes the exchange operation of the relevant cartridge 12. In S207, the controller 61 causes the display portion 50 (operation panel) to display a message requesting the user to perform an operation after completion of the exchange of the cartridge 12. In response to input of exchange completion from the user, the controller 61 puts the locking pin 44 in the locked state and executes ending processing, and thus ends a series of exchange flows.

In S208, the controller 61 causes the display portion 50 (operation panel) to display a message prompting the user to check again whether or not the image defect occurs (re-check instruction). In S209, the controller 61 waits for input from the user and then discriminates whether or not the user inputs the occurrence of the image defect at the display portion 50. In S209, in the case where the controller 61 discriminated that the user inputs the occurrence of the image defect, the controller 61 causes the processing to go to S210. In S210, the controller 61 causes the display portion 50 to display a message prompting the user to request service person handling (service person handling instruction). In S209, in the case where the controller 61 discriminated that the user inputs non-occurrence of the image defect, the occurrence of the image defect is a temporary phenomenon, and there is a high possibility that this phenomenon disappears, and therefore, the controller 61 ends a series of processes as it is.

Thus, in the case where the user requests the exchange of the cartridge 12 although the cartridge 12 does not reach the end of the lifetime thereof, the controller 61 executes the abnormality diagnosis (exchange diagnosis). Then, the controller 61 discriminates the occurrence or non-occurrence of the abnormality of the cartridge 12 and thus discriminates (specifies) the exchange object cartridge 12, and then executes release of the locking pin 44 only for the exchange object cartridge 12. By this, it is possible to prevent an unnecessary exchange of the cartridge 12 and an erroneous exchange of the cartridge 12.

In the embodiment 1, the locking mechanism of the color image forming apparatus including the plurality of cartridges was described, but in a monochromatic image forming apparatus including only one cartridge, similar control is capable of being carried out. As described above, according to the embodiment 1, it is possible to improve usability relating to the locking mechanism for the exchangeable unit.

Modified Embodiment 1

In the embodiment 1, description was made using the constitution shown in FIGS. 2 and 3, but as a constitution of the door and the door lock, even in the case of a constitution of FIG. 8, it is possible to carry out equivalent control. A constitution of part (a) of FIG. 8 shows the case where a plurality of doors 45 which are each an openable (and closable) member are provided correspondingly to the plurality of cartridges 12, respectively. Specifically, the image forming apparatus 1 is provided with doors 45Y, 45M, 45C, and 45K and locking pins 47Y, 47M, 47C, and 47K. Each door 45 is locked in a state in which the associated locking pin 47 is moved downward in part (a) of FIG. 8 (locked state), and the lock is released in a state in which the locking pin 47 is moved upward in part (a) of FIG. 8 (lock-released state). The controller 61 controls open/close of the door 45 by switching the state of the locking pin 47. In S205 in the exchange diagnosis processing of FIG. 7, the controller 61 puts the locking pin 47 corresponding to the relevant cartridge 12 in the lock-released state, so that the controller 61 puts the door 45 in the open position. Incidentally, the image forming apparatus 1 with the constitution of part (a) of FIG. 8 may further include locking members 43Y, 43M, 43C, and 43K, and locking pins 44Y, 44M, 44C, and 44K.

Thus, the image forming apparatus 1 of part (a) of FIG. 8 includes the plurality of cartridges 12 and the plurality of doors 45Y, 45M, 45C, and 45K which are provided for the plurality of cartridges 12, respectively, and which can be disposed in the open position and the closed position. The locking mechanism is provided for each door 45, and is in a released state for putting the door 45 in the open position so that the cartridge 12 can be taken out when the cartridge 12 is exchanged. On the other hand, the locking mechanism is in the locked state for putting the door 45 in the closed position so that the cartridge 12 cannot be taken out when the cartridge 12 is not exchanged. The locking mechanism includes the locking pin 47. The controller 61 functions as a switching mechanism for switching the released state and the locked state of the locking mechanism.

Modified Embodiment 2

Part (b) of FIG. 8 shows the case where the image forming apparatus 1 is provided with a single door 52 for the four cartridges 12Y, 12M, 12C, and 12K. The door 52 is locked in a state in which the locking pin 47 is moved downward in part (b) of FIG. 8 (locked state), and the lock is released in a state in which the locking pin 47 is moved upward in part (b) of FIG. 8 (lock-released state). The controller 61 controls open/close of the door 52 by switching the state of the locking pin 47. In S205 in the exchange diagnosis processing of FIG. 7, the controller 61 puts the locking pin 47 in the lock-released state and puts the door 52 in the open position. Incidentally, the image forming apparatus 1 with the constitution of part (b) of FIG. 8 may further include the locking members 43Y, 43M, 43C, and 43K, and the locking pins 44Y, 44M, 44C, and 44K.

Thus, the image forming apparatus 1 of part (b) of FIG. 8 includes the plurality of cartridges 12 and the single door 52 which can be disposed in the open position and the closed position. The locking mechanism is provided for the door 52, and is in a released state for putting the door 52 in the open position so that the cartridge 12 can be taken out when the cartridge 12 is exchanged. On the other hand, the locking mechanism is in the locked state for putting the door 52 in the closed position so that the cartridge 12 cannot be taken out when the cartridge 12 is not exchanged. The locking mechanism includes the locking pin 47. The controller 61 functions as a switching mechanism for switching the released state and the locked state of the locking mechanism.

FIG. 17 is a flowchart for illustrating permission and prohibition of switching from the restricted state to the non-restricted state. In S601, the controller 61 acquires an acquisition value on use of the cartridge 12. In S602, the controller 61 discriminates whether or not the acquisition value is larger than a threshold. In S602, in the case where the controller 61 discriminated that the acquisition value is larger than the threshold, the controller 61 causes the processing to go to S603, and in the case where the controller 61 discriminated that the acquisition value is not more than the threshold, the controller 61 causes the processing to go to S604. In S603, the controller 61 permits switching from the restricted state to the non-restricted state, and then ends the processing. In S604, the controller 61 discriminates whether or not abnormality occurs by the above-described method. In S604, in the case where the controller 61 discriminated that the abnormality occurs, the controller 61 causes the processing to go to S603, and in the case where the controller 61 discriminated that the abnormality does not occur, the controller 61 causes the processing to go to S605. In S605, the controller 61 prohibits the switching from the restricted state to the non-restricted state, and then ends the processing. Thus, in the case where the abnormality is not detected by the torque detecting portion 208 in a first period until the acquisition value reaches the threshold, the controller 61 controls the locking mechanism so as not to permit the switching from the restricted state to the non-restricted state. On the other hand, in the case where the abnormality is detected by the torque detecting portion 208, the controller 61 controls the locking mechanism so as to permit the switching from the restricted state to the non-restricted state. In a second period after the acquisition value reached the threshold, the controller 61 controls the locking mechanism so as to permit the switching from the restricted state to the non-restricted state.

As described above, according to the embodiment 1, when the user wishes the cartridge exchange, the consumable which should be exchanged is properly notified to the user, so that the erroneous exchange of the cartridge of which exchange is unnecessary is prevented and thus usability during the exchange of the cartridge can be improved.

Embodiment 2

[Exchange Object Unit Discrimination and Locking Mechanism Release by Image Diagnosis]

In an embodiment 2, the case where in an image forming apparatus including a reading device for reading an image formed on a sheet 21, image diagnosis is executed and on the basis of a diagnosis result, exchange discrimination of the cartridge 12 and control of door lock for the cartridge 12 are carried out will be described.

[Control Constitution]

FIG. 9 is a control block diagram in the embodiment 2, a difference from the control block diagram of FIG. 4 is described, and another description will be omitted. In the embodiment 2, a constitution in which, in the case where the user finds the image defect at an original timing before the cartridge 12 reaches the end of the lifetime and then requires the exchange of the cartridge 12, image diagnosis is executed and the cartridge 12 causing the abnormality is specified and then lock of the cartridge 12, which is an exchange object, is released, is employed. In the embodiment 2, an image diagnosis controller 211 (described later) functions as a detecting portion for detecting abnormality of the cartridge 12 (toner container 6). Further, the controller 61 functions as a second discriminating means for specifying a cartridge 12 causing abnormality in the case where the user requires the exchange of the cartridge 12, the controller 61 discriminates the occurrence or non-occurrence of the abnormality of the cartridge 12 on the basis of a diagnosis result by the image diagnosis controller 211 and thus discriminates that the abnormality occurs.

When the user executes the exchange diagnosis of the cartridge 12 from the display portion 50, the controller 61 receives image data for the image diagnosis and once stores the received image data in a memory of the management controller 202. Then, the management controller 202 controls the image forming apparatus on the basis of the image data stored in the memory, so that the image is formed on the sheet 21. The image diagnosis controller 211 controls a reading portion in accordance with an instruction of the management controller 202 during image diagnosis execution requirement, and causes the reading portion to read the formed image and executes discrimination of the occurrence or non-occurrence of the image defect and specification (identification) of a unit causing the image defect.

[Reading Device]

FIG. 10 is a schematic sectional view of an image forming apparatus 2 including an original reading unit 300 which is the reading portion used in the embodiment 2. On a tray 301 of the original reading unit 300, originals G are placed. A feeding roller 302 feeds the original G on the tray 301 to a conveying passage 304. At this time, a separation roller 303 prevents double feeding of the originals G. A reading portion 305 includes a cartridge image sensor and optically reads an image on a surface of the original G conveyed along the conveying passage 304, and then outputs image data, which is a reading result, to the controller 61. The image data is, for example, information indicating each of red (R), green (G), and blue (B) by 8 bits (0 to 255) for each of pixels. Thereafter, the original G is discharged on a tray 307 by a discharging roller pair 306.

Incidentally, a constitution of the image forming apparatus 2 is similar to the constitution of the image forming apparatus 1 of FIG. 1 and will be omitted from description by adding the same reference numerals or symbols. Further, the image forming apparatus 2 also includes the display portion 50 although the display portion 50 is not shown in FIG. 10.

[Image Diagnosis Processing During Cartridge Exchange Requirement by User]

FIG. 11 is a flowchart showing discrimination of an exchange object unit by image diagnosis and locking mechanism release in the embodiment 2. In the case where the user executes exchange diagnosis of the cartridge 12 by an operation of the display portion 50, the controller 61 starts processing of S301 and later. In S301, the controller 61 receives an exchange request of the cartridge 12 by the user and starts the exchange diagnosis. In S302, the controller 61 starts image diagnosis. Detailed processing of the image diagnosis will be described later using FIG. 12.

In S303, the controller 61 discriminates occurrence or non-occurrence of the image defect. Specifically, the controller 61 discriminates whether or not the image has a defect. The controller 61 functions as image defect detecting portion for detecting image defect of an inspection image on the basis of image data read by the original reading unit 300. In S303, in the case where the controller 61 discriminated that the image defect occurred, the controller 61 causes the processing to go to S304. In S303, in the case where the controller 61 discriminated that the image defect did not occur, the controller 61 ends a series of processes.

Incidentally, in the case where as a result of the diagnosis, the image defect does not occur, the controller 61 may cause the display portion 50 to display a message that for the exchange request from the user, as the result of the diagnosis, the abnormality does not occur and there is no need to exchange the cartridge 12.

In S304, the controller 61 discriminates whether or not the image defect occurs due to the cartridge 12. In S304, in the case where the controller 61 discriminated that the image defect occurs due to the cartridge 12, the controller 61 causes the processing to go to S305. Incidentally, whether or not the image defect results from the cartridge 12 will be described later with reference to FIG. 12. In S304, in the case where the controller 61 discriminated that the image defect does not result from the cartridge 12, the controller 61 causes the processing to go to S309. In S305, the controller 61 executes the lock release of the cartridge 12 causing the image defect. In S306, the controller 61 causes the display portion 50 to display the cartridge 12 which is the exchange object and to display an operation instruction to the user.

In S307, the controller 61 waits for an end of execution of the exchange operation by the user through opening/closing of the door 40. In S308, the controller 61 causes the display portion 50 to display a message prompting the user to perform an operation of ending the exchange of the cartridge 12. In S308, the controller 61 executes the lock of the cartridge 12 and ends a series of processes after the end of the operation by the user. In S309, the controller 61 causes the display portion 50 to display a message of service person handling and ends the series of processes.

(Image Diagnosis Processing)

FIG. 12 is a flowchart showing an example of the image diagnosis processing executed by the controller 61 in S302 of FIG. 11. Further, part (a) of FIG. 13 shows an inspection image of the embodiment 2. Incidentally, in part (a) of FIG. 13, Y-direction is a conveying direction of the sheet 21 and is also referred to as a sub-scan direction. Further, X-direction is a direction perpendicular to the Y-direction in a plane of the sheet 21 and is also referred to as a main scan direction.

The inspection image includes a plurality of reference images formed in a region A with a plurality of reference colors, respectively.

In the embodiment 2, the plurality of reference colors are yellow, magenta, cyan, and black, and reference images PY, PM, PC, and PK are formed in the region A. Further, the inspection image includes, in a region B, a discrimination image Pb of yellow (toner), magenta (toner), cyan (toner) and black (toner) superposed each at a density (concentration) of 10%. Incidentally, the density of each color (toner) is not limited to 10%. The discrimination image Pb is formed as large as possible.

In S401, the controller 61 forms the inspection image. In S402, the controller 61 causes the user to set an original G, on which the inspection image is formed, on the tray 301 of the original reading unit 300 and causes the original reading unit 300 to read the sheet 21 (original G) on which the inspection image is formed.

The original reading unit 300 outputs read image data to the controller 61.

As shown in part (A) of a table 4 below, the controller 61 discriminates color values of the reference images PY, PM, PC, and PK, and a region in which the reference images PY, PM, PC, and PK, and the discrimination image Pb are not formed (hereinafter this region is referred to as a ground region ("ground")) in RGB color space, and causes the memory to store these color values. Incidentally, each of the color values of the reference images PY, PM, PC, and PK can be taken as an average value of a specific pixel or all the pixels in the reference image. Further, the color value of the ground region can be taken as an average value of a specific pixel or all the pixels in the ground region. For example, the controller 61 acquires a value of (R, G, B)=(255, 212, 0) as a result of reading the reference image PY. Further, the controller 61 acquires a value of (R, G, B)=(239, 236, 237) as a result of reading the ground region.

TABLE 4

| | yellow | magenta | cyan | black | ground |
|---|---|---|---|---|---|
| | | (A) | | | |
| R | 255 | 236 | 0 | 38 | 239 |
| G | 212 | 0 | 156 | 36 | 236 |
| B | 0 | 140 | 209 | 37 | 237 |
| | | (B) | | | |
| L* | 87.7 | 54.3 | 68.8 | 41.4 | 91 |
| a* | −6.3 | 77.1 | −36.9 | 0.9 | −0.2 |
| b* | 99.7 | −30.9 | −22.8 | 1.9 | 4.2 |

| | yellow | magenta | cyan | black |
|---|---|---|---|---|
| | | (C) | | |
| L* | −3.3 | −36.7 | −22.2 | −49.6 |
| a* | −6.2 | 77.3 | −36.7 | 1 |
| b* | 95.6 | −35 | −27 | −2.3 |
| | | (D) | | |
| L* | −0.034 | −0.397 | −0.437 | −0.999 |
| a* | −0.064 | 0.836 | −0.724 | 0.021 |
| b* | 0.997 | −0.379 | −0.533 | −0.046 |

In S403, the controller 61 converts the color values of the reference images PY, PM, PC, and PK and the ground region in the RGB color space, acquired in S402 into color values in L*a*b* color space. Part (B) of the table 4 is a table 4 showing the color values in the L*a*b* color space converted from the color values shown in part (A) of the table 4. In the following, unless otherwise specified, the "color space" means the L*a*b* color space, and the "color value" means the color values in the L*a*b* color space. For example, the controller 61 acquires a value of (L*a*b*)=(87.7, −6.3, 99.7) as a result of color conversion for the reference image PY. Further, the controller 61 acquires a value of (L*a*b*)=(91, −0.2, 4.2) as a result of color conversion for the ground region.

In S404, the color value is normalized. First, the controller 61 subtracts the color value of the ground region from the color values of the reference images PY, PM, PC, and PK shown in part (B) of the table 4. This processing corresponds to that the color value of the ground is taken as the origin of the color space. Part (C) of the table 4 shows values obtained by subtracting the color value of the ground region from the color values of the reference images PY, PM, PC, and PK shown in part (B) of the table 4. For example, the controller 61 acquires a value of (L*a*b*)=(−3.3, −6.2, 95.6) for yellow.

Then, the controller 61 normalizes each of the color values shown in part (C) of the table 4 to vector of a length of 1 in the color space. For example, the controller 61 acquires a normalized value of (L*a*b*)=(=−0.034, −0.064, 0.997) for yellow. Incidentally, this processing corresponds to that a unit vector is acquired for each of the vectors of part (D) of the table 4. Hereinafter, the color values of the reference images PY, PM, PC, and PK shown in part (D) of the table 4 are referred to as reference vectors of Y, M, C, and K, respectively.

Further, the controller 61 also similarly converts the color value of each pixel of the discrimination image Pb, read by the original reading unit 300, in the RGB space to a color value in the L*a*b* color space, and after the color value of the ground region is subtracted from the color value (in the L*a*b* color space), converts the resultant color values to a unit vector. In the following, this unit vector of the pixel of the discrimination image Pb is referred to as a discrimination vector.

In S405, the controller 61 discriminates a change amount. Here, the controller 61 discriminates a highest-density image and a lowest-density image in the discrimination image Pb, discriminated from the image data read from the discrimination image Pb, on the basis of the color values of each pixel. Then, the controller 61 acquires an inner product between a discrimination vector of the highest-density pixel and a reference vector of each of Y, M, C, and K and an inner product between a discrimination vector of the lowest-density pixel and the reference vector of each of Y, M, C, and K.

For example, part (A) of a table 5 shows the discrimination vector of the highest-density pixel and the discrimination vector of the lowest-density pixel in the discrimination image Pb in the case where the inspection image is formed as shown in part (b) of FIG. 13. Incidentally, the inspection image on the rightmost side of part (b) of FIG. 13 is formed by superposing four color images shown on a left side thereof. In part (b) of FIG. 13, with respect to the sub-scan direction, the magenta image causes density non-uniformity, whereby also in the discrimination image Pb, a high-density region (or a normal density region) F2 and a low-density region F3 generate. In part (A) of FIG. 5, Pb (high density) are color values in the high-density region F2, and Pb (low density) are color values in the low-density region F3.

TABLE 5

(A)

| | Pb (HD*[1]) | Pb (LD*[2]) |
|---|---|---|
| L* | −0.871 | −0.826 |
| a* | 0.333 | −0.288 |
| b* | 0.36 | 0.484 |

(B)

| | Y | M | C | K |
|---|---|---|---|---|
| Pb (HD*[1]) | 0.367 | 0.488 | −0.052 | 0.86 |
| Pb (LD*[2]) | 0.529 | −0.096 | 0.312 | 0.797 |
| CA (AV)*[3] | 0.16 | 0.58 | 0.36 | 0.06 |

*[1]"HD" is a high density.
*[2]"LD" is a low density.
*[3]"CA (AV)" is a change amount (absolute value).

Part (b) of the table 5 shows an inner product between the discrimination vector shown in part (A) of the table 5 and the reference vector of each of Y, M, C, and K. In S405, the controller 61 acquires, as the change amount, a difference (absolute value) between the inner product with the maximum-density pixel and the inner product with the lowest-density pixel for each reference color as shown in part (B) of the table 5. Both the reference vector and the discrimination vector are unit rectors, and therefore, the inner product between the reference vector and the discrimination vector becomes a value depending on an angle between the reference vector and the discrimination vector. Accordingly, the change amount shown in part (B) of the table 5 corresponds to a maximum value of the change amount of an angle of the discrimination vector of each of the plurality of pixels in the discrimination image Pb.

In S406, the controller 61 discriminates whether or not all the change amounts acquired in S405 are larger than a first threshold. Incidentally, the first threshold can be made the same irrespective of color and can also be made different values for each color. In the case where the controller 61 discriminated that the change amounts for all the colors is not more than the first threshold, the controller 61 discriminates that there is no image defect, i.e., the image defect due to the cartridge 12 does not occur, and then ends the processing of the image diagnosis.

On the other hand, in the case where the controller 61 discriminated in S406 that there is a color for which the change amount is larger than the first threshold, the controller 61 causes the processing to go to S407. In S407, the controller 61 discriminates that the image defect occurs. This is because a change amount in angle of the discrimination vector relative to the reference vector for a certain reference color becomes larger with a larger change in the reference color in the discrimination image Pb. Further, in this case, the cartridge 12 causing the image defect corresponds to a color for which the change amount is larger than the threshold. The controller 61 discriminates the occurrence of the image defect and the cartridge 12 causing the image defect, and then ends the processing of the image diagnosis.

In this embodiment, as described above, as shown in FIG. 10, the case where the image is read and diagnosed by the original reading unit 300 was described, but in a constitution not including the original reading unit 300, for example, the present invention may be executed in a constitution in which a reading device is incorporated on a conveying passage or a double-side conveying passage after the fixing device. In this case, after the image is once formed, without execution of a reading operation by the user, automatic image formation and automatic image reading become possible after a start of the diagnosis, and therefore, the diagnosis is capable of being executed by a simpler operation.

As described above, according to the embodiment 2, when the user wishes the cartridge exchange, the consumable which should be exchanged is properly notified to the user, so that the erroneous exchange of the cartridge of which exchange is unnecessary is prevented and thus usability during the exchange of the cartridge can be improved.

Embodiment 3

Both the discrimination by the torque detection in the embodiment 1 and the discrimination by the image diagnosis in the embodiment 2 were described as an example in which these discriminations are controlled by the controller 61 in the engine, but in an embodiment 3, a constitution in which these discriminations are executed through arithmetic processing by an external server via an external network is described.

[Network Constitution of Image Forming Apparatus]

In FIG. 14, an example of a constitution of a network to which a plurality of an image forming apparatus 1 and an image forming apparatus 2, which constitute an image forming system of the embodiment 3, will be described. The image forming apparatuses 1 and 2 are installed in a user environment E1 in which the user is present and are connected to a local network NW1 which can be, for example, a LAN (local area network). A management server 400 is installed in a remote environment E2. The remote environment E2 is connected to the local network NW1 via an external network NW2. The external network NW2 may be, for example, an internet or VPN (virtual private network). Each of the local network NW1 and the external network may also include network devices, of an arbitrary kind and in any number, such as a router, a switch, a gateway, a wireless access point, and a base station.

In the user environment E1, the user utilizes the image forming apparatus 1 or the image forming apparatus 2.

In the image forming apparatuses 1 and 2, as described above, an arbitrary image is printed by way of the image forming process. During this image formation, a detection result detected by the torque detecting portion 208 in the embodiment 1 is acquired and is stored in the memory, and then is sent to the management server 400. In the management server 400, from the sent data, a state of the cartridge 12 is discriminated by averaging processing, regressive processing, or the like processing. That is, the discrimination of S102 of FIG. 5 made by the controller 61 is carried out on the management server 400 side. A discrimination result of the discrimination made on the management server 400 side as described above is notified to, for example, the display portion 50 of the image forming apparatuses 1 and 2 via the external network NW2 and the local network NW1. Further, a specification of notifying the discrimination result onto a monitoring tool 500 (described later) with reference to FIG. 15 may be employed.

Further, the management server 400 used in this embodiment is implemented as an application server, a data base server, or a cloud server. Thus, in the case where analysis is made using an external storing means or an external processing (operation) means, connected via the network, without being affected by restriction of performance and capacity of a CPU incorporated in the image forming apparatus main assembly, statistical processing such as averaging and regression is performed using many data, so that analysis becomes possible. For that reason, detection accuracy of torque abnormality and discrimination accuracy of identification of the cartridge can be improved. Incidentally, a function of the management server 400 may be provided by a single device, or may also be provided so that a plurality of physically separated devices are cooperated mutually and function as the management server 400 as a whole.

[Control Constitution]

FIG. 15 is a block diagram of a control constitution in the embodiment 2. The control constitution in the embodiment 3 is constituted by the image forming apparatus 1, the management server 400, and the monitoring tool 500. Incidentally, as regards the image forming apparatus 1 in FIG. 15, constituent elements similar to those in FIG. 4 are represented by the same reference numerals or symbols, and will be omitted from description.

The image forming apparatus 1 sends, to a printer engine, image data and print instruction which are sent from a host computer (not shown). The management server 400 includes a management server controller 410 including an operation device 412 and a storing device 414, and is connected via networks through which the management server 400 has access to the image forming apparatus 1 and the monitoring tool 500 bi-directionally. The operation device 412 performs execution of a program stored in the storing device 414 and reading/writing of various data. To the operation device 412, a CPU or a GPU may be assigned. To the storing device 414, a RAM, an HDD, or an SSD, or the like may be directly assigned, or a virtual environment such as a virtual machine may be assigned. The management server controller 410 is connected to the controller 61 in the image forming apparatus 1, so that it is possible to transfer information between itself and the controller 61.

The monitoring tool 500 is a tool used in the case where a dealer manages each image forming apparatus and includes a monitoring tool controller 510 for receiving information from the management server controller 410 and an operation display portion 520 for displaying the received information. Here, the operation display portion 520 included by the monitoring tool 500 includes a display, a keyboard, a mouse, and the like (which are not shown). Incidentally, the form of the monitoring tool 500 is not limited to a personal computer or a server, but may also be a virtual environment such as a virtual machine or a tablet terminal. Incidentally, in FIG. 15, the image forming apparatus 1 can be replaced with the image forming apparatus 2 in FIG. 9.

Processing of Embodiment 3

Operations of the controller 61, the management server controller 410, and the monitoring tool 500 will be described using a flowchart of FIG. 16. In the flowchart of FIG. 16, the user requires diagnosis from the display portion 50, and processing is started when the controller 61 receives a diagnosis instruction.

Here, in the flowchart of FIG. 16, processing of S501 and S504 to S511 are similar to the processings of S201 and S203 to S210, respectively, in FIG. 7 described in the embodiment 1, and therefore, will be omitted from specific description thereof. Incidentally, a processing entity in FIG. 16 is mainly the management server controller 410. In S501, when exchange diagnosis is started, the controller 61 of the image forming apparatus 1 causes the torque detecting portion 208 to perform torque detection, specifically current detection, and thus acquires a detection result. In the embodiment 3, the controller 61 does not carry out the processings of S202 and later in FIG. 7, and sends the detection result to the management server 400 via the network. Then, the management server controller 410 of the management server 400 executes the processings of S502 and later.

Incidentally, in the embodiment 1, a result of the exchange diagnosis, i.e., information on whether or not the torque abnormality occurs and as to which cartridge 12 causes the torque abnormality in the case where the torque abnormality occurs was displayed at the display portion 50 of the image forming apparatus 1. Then, the user notified the controller 61 of an end of the exchange of the cartridge 12 or the like result by operating the display portion 50. In the embodiment 3, not only by the display portion 50, but also by the operation display portion 520 of the monitoring tool 500, display and input of the information may be performed.

In S502, the management server controller 410 starts arithmetic (operation) processing with use of a detection result sent from the controller 61 by the operation device 412 and the storing device 414 (sever data operation start). In S503, the management server controller 410 performs the operation such that is executed by the controller 61 in the embodiment 1, and acquires a current detection subjected to operation processing (operation result acquisition). Incidentally, the operation processing by the management server controller 410 may be any operation processing. For example, the current detection result may be the last current detection result obtained by averaging all the last data or by extracting a maximum value for day from data of the last one month and then by acquiring moving average from data of the maximum value in one month. In addition, the current detection result may be corrected depending on a print condition and then may be used. Thus, the operation processing is carried out on the management server 400 side, so that it becomes possible to perform the operation which was complicated and difficult on the controller 61 side of the image forming apparatus 1. In this case, moving average data of the maximum value in one month were used.

Incidentally, this is also true for the case where the image forming apparatus 1 is replaced with the image forming apparatus 2. For example, of the processings of FIG. 12 executed by the image diagnosis controller 211, the controller 61 may send a reading result of the inspection image in S402 to the management server 400. Then, the management server 400 may perform the processings of S403 and S407 in FIG. 12 with use of the reading result of the inspection image sent from the image forming apparatus 2. The management server 400 may send, to the image forming apparatus 2, a result as to whether or not the image defect occurs and a result of identification as to which cartridge 12 causes the image defect in the case where the image defect occurs.

That is, in the case where exchange request is made from a user who uses the image forming apparatus 2, processing in accordance with the flowchart of FIG. 11 described in the embodiment 2 may only be required to carry out by the image forming apparatus 2 and the management server 400 in cooperation. For example, the processing of S302 in FIG. 11 and the processings of S410 and S402 in FIG. 12, i.e., the formation of the inspection image and the reading of the inspection image are performed by the image forming apparatus 2, and a result thereof is sent to the management server 400. The management server 400 may only be required to perform the processings corresponding to S502 and S503 in FIG. 16, for example, the processings of S403 and later in FIG. 12 and the processings of S303 and later in FIG. 11. A diagnosis result, i.e., the occurrence or non-occurrence of the image defect or an identification result in the case where the image defect occurs may only be required to display at the display portion 50 of the image forming apparatus 2 or the operation display portion 520 of the monitoring tool 500. Then, information on an end of the exchange of the cartridge 12 may be acquired from the display portion 50 or the operation display portion 520. In the embodiment 3, the management server controller 410 or the monitoring tool controller 510 functions as all or a part of the notifying means, the first discriminating means, the second discriminating means, and the image defect detecting portion.

Thus, in the case where the user requests the image data, the cartridge abnormality diagnosis (exchange diagnosis) is carried out, and discrimination of occurrence or non-occurrence of the abnormality and discrimination of the cartridge which is the exchange object are made, and then release of the locking mechanism only for the exchange object cartridge is carried out. By this, also in the embodiment 3, it is possible to prevent unnecessary exchange and the erroneous exchange of the cartridge.

In this embodiment, an example in which the operation is executed from the detection result stored in the management server 400 at the timing when the user requests the exchange and then the discrimination is made was described, but the present invention is not limited thereto. For example, at a predetermined timing, the last current detection result operated on the management server 400 is periodically notified to the memory of the controller 61, and then discrimination is made using an updated detection result. For example, a constitution in which the current detection result acquired on the management server 400 side is stored in the memory of the controller 61 while being updated for each day, and then the image forming apparatus 1 makes reference to the stored result may be employed. In this case, even when the exchange request is made, the last current detection result is stored in advance in the memory, and therefore, the image forming apparatus 1 may only be required to make reference to the current detection result, so that it becomes possible to shorten a processing time. As in the embodiment 3, the operation and the analysis such as regression become possible from mass data on the external server, and therefore, in a condition in accordance with the use state of the user, it becomes possible to notify a substantially lifetime with high accuracy.

As described above, according to the embodiment 3, when the user wishes the cartridge exchange, the consumable which should be exchanged is properly notified to the user, so that the erroneous exchange of the cartridge of which exchange is unnecessary is prevented and thus usability during the exchange of the cartridge can be improved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-064157 filed on Apr. 11, 2023, which is hereby incorporated by reference herein in its entirety.

What is claimed is:

1. An image forming apparatus comprising:
a cartridge including an accommodating portion configured to accommodate a developer; and
a main assembly to which the cartridge is detachably mountable,
wherein the main assembly includes:
an acquiring portion configured to acquire an acquisition value on a use amount of the cartridge;
a switching mechanism capable of switching between a restricted state in which detachment of the cartridge from the main assembly is restricted and a non-restricted state in which the detachment is not restricted;
a detecting portion configured to detect abnormality of the cartridge;
a controller configured to control the switching mechanism;
an image forming portion configured to form an inspection image which includes a first region and a second region, the first region being a region in which reference images are formed with a plurality of color images, respectively, on a recording material, the second region being a region in which a discrimination image is formed by superimposing a plurality of color images on the recording material; and
a reading portion configured to read the reference images and the discrimination image formed on the recording material by the image forming portion,
wherein the controller controls the switching mechanism:
so that in a first period until the acquisition value reaches a threshold, switching from the restricted state to the non-restricted state is not permitted in a case that the abnormality of the cartridge is not detected by the detecting portion, and the switching from the restricted state to the non-restricted state is permitted in a case that the abnormality of the cartridge is detected by the detecting portion, and
so that in a second period after the acquisition value has reached the threshold, the switching from the restricted state to the non-restricted state is permitted, and
wherein the case that the abnormality of the cartridge is detected by the detecting portion is that a density change amount between the discrimination image and the reference images on the basis of information read from both the reference images and the discrimination image by the reading portion is greater than a density threshold.

2. The image forming apparatus according to claim 1, further comprising a photosensitive drum and an exposure portion configured to form an electrostatic latent image on the photosensitive drum on the basis of inputted image data, wherein the acquiring portion acquires the use amount of the cartridge on the basis of at least one of a rotation time of the photosensitive drum, a rotation distance of the photosensitive drum, and a number of pixels of the inputted image data.

3. The image forming apparatus according to claim 1, wherein the main assembly further includes:

an opening through which the cartridge passes when the cartridge is mounted to and dismounted from the main assembly, an openable member movable to a closed position where the openable member closes the opening and an open position where the openable member opens the opening, and a locking mechanism capable of switching between a locked state in which the locking mechanism locks the openable member so as not to be movable from the closed position to the open position and an unlocked state in which the locking mechanism permits the openable member to move from the closed position to the open position, and wherein the switching mechanism is the locking mechanism, the locked state is the restricted state, and the unlocked state is the non-restricted state.

4. The image forming apparatus according to claim 1, further comprising a plurality of cartridges, wherein the main assembly further includes:

openings, each of which is provided corresponding to one of the cartridges and through which one of the cartridges passes when the cartridge is mounted to and dismounted from the main assembly, an openable member movable to a closed position where the openable member closes the openings and an open position where the openable member opens the openings, and a locking mechanism capable of switching between a locked state in which the locking mechanism locks the openable member so as not to be movable from the closed position to the open position and an unlocked state in which the locking mechanism permits the openable member to move from the closed position to the open position, and wherein the switching mechanism is the locking mechanism, the locked state is the restricted state, and the unlocked state is the non-restricted state.

5. The image forming apparatus according to claim 1, further comprising a plurality of cartridges, wherein the main assembly further includes:

an opening through which the cartridges pass when the cartridges are mounted to and dismounted from the main assembly, an openable member movable to a closed position where the openable member closes the opening and an open position where the openable member opens the opening, and a locking mechanism capable of switching between a locked state in which the locking mechanism locks the openable member so as not to be movable from the closed position to the open position and an unlocked state in which the locking mechanism permits the openable member to move from the closed position to the open position, and wherein the switching mechanism is the locking mechanism, the locked state is the restricted state, and the unlocked state is the non-restricted state.

6. An image forming system comprising:

an image forming apparatus which includes a cartridge including an accommodating portion configured to accommodate a developer, and a main assembly to which the cartridge is detachably mountable; and a server connected to the image forming apparatus via a network, wherein the image forming system includes:

an acquiring portion configured to acquire an acquisition value on a use amount of the cartridge;

a detecting portion configured to detect abnormality of the cartridge;

an image forming portion configured to form an inspection image which includes a first region and a second region, the first region being a region in which reference images are formed with a plurality of color images, respectively, on a recording material, the second region being a region in which a discrimination image is formed by superimposing a plurality of color images on the recording material;

a reading portion configured to read the reference images and the discrimination image formed on the recording material by the image forming portion; and at least one controller, wherein the main assembly includes a switching mechanism capable of switching between a restricted state in which detachment of the cartridge from the main assembly is restricted and a non-restricted state in which the detachment is not restricted;

wherein the at least one controller controls the switching mechanism;

so that in a first period until the acquisition value reaches a threshold, switching from the restricted state to the non-restricted state is not permitted in a case that the abnormality of the cartridge is not detected by the detecting portion, and the switching from the restricted state to the non-restricted state is permitted in a case that the abnormality of the cartridge is detected by the detecting portion, and so that in a second period after the acquisition value has reached the threshold, the switching from the restricted state to the non-restricted state is permitted, and wherein the case that the abnormality of the cartridge is detected by the detecting portion is that a density change amount between the discrimination image and the reference images on the basis of information read from both the reference images and the discrimination image by the reading portion is greater than a density threshold.

7. The image forming system according to claim 6, wherein the server includes the detecting portion.

8. The image forming system according to claim 6, wherein the image forming apparatus includes a photosensitive drum and an exposure portion configured to form an electrostatic latent image on the photosensitive drum on the basis of inputted image data, and wherein the acquiring portion acquires the use amount of the cartridge on the basis of at least one of a rotation time of the photosensitive drum, a rotation distance of the photosensitive drum, and a number of pixels of the inputted image data.

9. The image forming system according to claim 6, wherein the main assembly further includes:

an opening through which the cartridge passes when the cartridge is mounted to and dismounted from the main assembly, an openable member movable to a closed position where the openable member closes the opening and an open position where the openable member opens the opening, and a locking mechanism capable of switching between a locked state in which the locking mechanism locks the openable member so as not to be movable from the closed position to the open position and an unlocked state in which the locking mechanism permits the openable member to move from the closed position to the open position, and wherein the switching mechanism is the locking mechanism, the locked state is the restricted state, and the unlocked state is the non-restricted state.

10. The image forming system according to claim 6, further comprising a plurality of cartridges, wherein the main assembly further includes:

openings, each of which is provided corresponding to one of the cartridges and through which one of the cartridges passes when the cartridge is mounted to and dismounted from the main assembly, an openable member movable to a closed position where the openable member closes the openings and an open position where the openable member opens the openings, and a locking mechanism capable of switching between a locked state in which the locking mechanism locks the openable member so as not to be movable from the closed position to the open position and an unlocked state in which the locking mechanism permits the openable member to move from the closed position to the open position, and wherein the switching mechanism is the locking mechanism, the locked state is the restricted state, and the unlocked state is the non-restricted state.

11. The image forming system according to claim 6, further comprising a plurality of cartridges, wherein the main assembly further includes;

an opening through which the cartridges pass when the cartridges are mounted to and dismounted from the main assembly, an openable member movable to a closed position where the openable member closes the opening and an open position where the openable member opens the opening, and a locking mechanism capable of switching between a locked state in which the locking mechanism locks the openable member so as not to be movable from the closed position to the open position and an unlocked state in which the locking mechanism permits the openable member to move from the closed position to the open position, and wherein the switching mechanism is the locking mechanism, the locked state is the restricted state, and the unlocked state is the non-restricted state.

12. An image forming apparatus comprising:

a cartridge accommodating a developer; and a main assembly to which the cartridge is detachably mountable, wherein the main assembly includes:

a notifying portion configured to notify of first information on a lifetime or an exchange of the cartridge and second information on abnormality of the cartridge;

a switching mechanism capable of switching between a restricted state in which detachment of the cartridge from the main assembly is restricted and a non-restricted state in which the detachment is not restricted;

an image forming portion configured to form an inspection image which includes a first region and a second region, the first region being a region in which reference images are formed with a plurality of color images, respectively, on a recording material, the second region being a region in which a discrimination image is formed by superimposing a plurality of color images on the recording material;

a reading portion configured to read the reference images and the discrimination image formed on the recording material by the image forming portion; and a controller configured to control the switching mechanism, wherein the controller controls the switching mechanism;

so that in a first period until notification of the first information, switching of the switching mechanism from the restricted state to the non-restricted state is not permitted in a case that notification of the second information does not occur, and the switching of the switching mechanism from the restricted state to the non-restricted state is permitted in a case that the notification of second information does occur, and so that in a second period after notification of the first information, the switching from the restricted state to the non-restricted state is permitted, and wherein the case that the abnormality of the cartridge is detected by the detecting portion is that a density change amount between the discrimination image and the reference images on the basis of information read from both the reference images and the discrimination image by the reading portion is greater than a density threshold.

13. The image forming apparatus according to claim 12, wherein the main assembly further includes:

an opening through which the cartridge passes when the cartridge is mounted to and dismounted from the main assembly, an openable member movable to a closed position where the openable member closes the opening and an open position where the openable member opens the opening, and a locking mechanism capable of switching between a locked state in which the locking mechanism locks the openable member so as not to be movable from the closed position to the open position and an unlocked state in which the locking mechanism permits the openable member to move from the closed position to the open position, and wherein the switching mechanism is the locking mechanism, the locked state is the restricted state, and the unlocked state is the non-restricted state.

14. The image forming apparatus according to claim 12, further comprising a plurality of cartridges, wherein the main assembly further includes:

openings, each of which is provided corresponding to one of the cartridges and through which one of the cartridges passes when the cartridge is mounted to and dismounted from the main assembly, an openable member movable to a closed position where the openable member closes the openings and an open position where the openable member opens the openings, and a locking mechanism capable of switching between a locked state in which the locking mechanism locks the openable member so as not to be movable from the closed position to the open position and an unlocked state in which the locking mechanism permits the openable member to move from the closed position to the open position, and wherein the switching mechanism is the locking mechanism, the locked state is the restricted state, and the unlocked state is the non-restricted state.

15. The image forming apparatus according to claim 12, further comprising a plurality of cartridges, wherein the main assembly further includes:

an opening through which the cartridges pass when the cartridges are mounted to and dismounted from the main assembly, an openable member movable to a closed position where the openable member closes the opening and an open position where the openable member opens the opening, and a locking mechanism capable of switching between a locked state in which the locking mechanism locks the openable member so as not to be movable from the closed position to the open position and an unlocked state in which the locking mechanism permits the openable member to move from the closed position to the open position, and wherein the switching mechanism is the locking mechanism, the locked state is the restricted state, and the unlocked state is the non-restricted state.

* * * * *